United States Patent
Agarwal et al.

(10) Patent No.: US 9,018,892 B2
(45) Date of Patent: Apr. 28, 2015

(54) PHOTO-VOLTAIC ARRAY FED SWITCHED CAPACITOR DC-DC CONVERTER BASED BATTERY CHARGING FOR LI-ION BATTERIES

(75) Inventors: Vivek Agarwal, Mumbai (IN); Pradeep Kuruvilla Peter, Mumbai (IN)

(73) Assignee: Indian Institute of Technology Bombay, Powai, Mumbai (IN)

( * ) Notice: Subject to any disclaimer, the term of this patent is extended or adjusted under 35 U.S.C. 154(b) by 504 days.

(21) Appl. No.: 13/265,619

(22) PCT Filed: May 30, 2011

(86) PCT No.: PCT/IB2011/001169
§ 371 (c)(1),
(2), (4) Date: Oct. 21, 2011

(87) PCT Pub. No.: WO2012/127270
PCT Pub. Date: Sep. 27, 2012

(65) Prior Publication Data
US 2013/0049673 A1    Feb. 28, 2013

(30) Foreign Application Priority Data
Mar. 23, 2011    (IN) .................... 849/MUM/2011

(51) Int. Cl.
H01M 10/44    (2006.01)
H02J 7/00    (2006.01)

(52) U.S. Cl.
CPC .................................. *H02J 7/0016* (2013.01)

(58) Field of Classification Search
CPC .................................................... H01M 10/482
USPC ................................................ 136/243–244
See application file for complete search history.

(56) References Cited

U.S. PATENT DOCUMENTS

| | | | |
|---|---|---|---|
| 4,370,559 A | 1/1983 | Langley, Jr. | |
| 4,441,143 A | 4/1984 | Richardson, Jr. | |
| 4,651,080 A | 3/1987 | Wallace | |
| 4,691,075 A | 9/1987 | Murphy | |

(Continued)

FOREIGN PATENT DOCUMENTS

DE    10 2009 027 685 A1    1/2011

OTHER PUBLICATIONS

Mohamed Azab, A New Maximum Power Point Tracking for Photovoltaic Systems, Nov. 2009, International Journal of Electrical and Electronics Engineering, p. 703.*

(Continued)

*Primary Examiner* — Drew A Dunn
*Assistant Examiner* — Zixuan Zhou
(74) *Attorney, Agent, or Firm* — Turk IP Law, LLC

(57) ABSTRACT

Technologies generally described herein relate to a cell balancing and charging scheme for a serially coupled Li-Ion battery pack supported by a photovoltaic cell array power source. A switched capacitor DC-DC converter and a cell monitoring approach may be used to charge and cell balance the battery pack. When one of the cells falls below a predefined voltage, a capacitor (charged by the photovoltaic array) may supply current to bring the voltage to the predefined point. Continuous monitoring for the cells during charging and discharging may ensure cell voltage changes beyond the predefined limit are detected timely. Cell balancing may be performed even in the absence of photovoltaic (PV) array illumination.

28 Claims, 12 Drawing Sheets

(56) References Cited

U.S. PATENT DOCUMENTS

| | | | |
|---|---|---|---|
| 4,695,120 A | 9/1987 | Holder | |
| 4,696,359 A | 9/1987 | Glibbery | |
| 4,841,416 A | 6/1989 | Doss | |
| 5,402,303 A | 3/1995 | Luck | |
| 5,530,335 A * | 6/1996 | Decker et al. | 320/102 |
| 5,710,504 A * | 1/1998 | Pascual et al. | 180/65.8 |
| 5,757,163 A * | 5/1998 | Brotto et al. | 320/155 |
| 6,044,698 A | 4/2000 | Bryan | |
| 6,057,665 A | 5/2000 | Herniter et al. | |
| 6,073,569 A | 6/2000 | Motsenbocker et al. | |
| 6,255,804 B1 | 7/2001 | Herniter et al. | |
| 6,571,722 B2 | 6/2003 | Motsenbocker et al. | |
| 6,844,703 B2 * | 1/2005 | Canter | 320/131 |
| 6,987,670 B2 | 1/2006 | Ahmed et al. | |
| 7,180,763 B2 | 2/2007 | Patwardhad et al. | |
| 7,453,232 B2 * | 11/2008 | Furukawa | 320/104 |
| 7,505,294 B2 | 3/2009 | Ahmed et al. | |
| 7,612,537 B2 | 11/2009 | Wyane et al. | |
| 7,843,411 B2 * | 11/2010 | Manning | 345/87 |
| 2009/0079385 A1 | 3/2009 | Xiao et al. | |
| 2009/0206666 A1 * | 8/2009 | Sella et al. | 307/43 |
| 2009/0266397 A1 | 10/2009 | Gibson et al. | |
| 2012/0256612 A1 * | 10/2012 | Alonso et al. | 323/311 |

OTHER PUBLICATIONS

M. Zahran, Charge Equalization Unit for a NiCd Battery of Small Earth Observation Satellite EPS Simulation, Proceedings of the 7th WSEAS International Conference on Power Systems, Beijing, China, Sep. 15-17, 2007, 7 pages.

Specification of Photovoltaic Module, Type: HIP-214NKHE5, Sanyo Electric Co., Ltd., Data Released Sep. 25, 2009, 7 pages.

S.C Tan, M. Nur, S. Kiratipongvoot, S. Bronstein, Y.M. Lai, C.K. Tse, A. Ioinovici, "Switched Capacitor Converter Configuration with Low EMI Emission Obtained by Interleaving and Its Large Signal Modeling", IEEE International Symposium on Circuits and Systems, pp. 1081-1084, May 2009.

Moore et al., A review of cell equalization methods for lithium ion and lithium polymer battery systems, Society of automotive engineers, Jan. 2001.

Speltino et al., Cell Equalization in Battery Stacks Through State of ChargeEstimation Polling, 6 pages.

Kimball et al., Increased Performance of Battery Packs by Active Equalization, SmartSpark Energy Systems, Champaign, Illinois, USA, pp. 1-5.

International Search Report and Written Opinion for PCT/IB2011/001169 mailed May 30, 2011.

Bentley, W,E, "Cell balancing considerations for lithium-ion battery systems," Twelfth annual battery conference on applications and advances, pp. 223-226, (Jan. 1997).

Bonfiglio, C., and Roessler, W., "A cost optimized battery management system with active balancing for lithium ion battery stacks," IEEE Vehicle Power and Propulsion Conference, 2009, VPPC '09, pp. 304-309 (Sep. 7-10, 2009).

Chakraborty, S., et al., "Novel converter topology and algorithm for simultaneous charging and individual cell balancing of multiple Li-ion batteries," 26th Annual International Telecommunications Energy Conference, pp. 248-253 (Sep. 19-23, 2004).

Drori, Y., and Martinez, C., "The benefits of cell balancing," Intersil, AN140.0, pp. 1-9 (Jul. 8, 2005).

Elias, M.F.M., et al., "Design of smart charger for series lithium-ion batteries," International conference on power electronics and drives systems (PEDS), vol. 2, pp. 1485-1490 (2005).

Park, H.S., et al., "Individual cell voltage equalizer using selective two current paths for series connected Li-ion battery strings," IEEE Energy conversion congress and exposition, pp. 1812.-1817 (Sep. 20-24, 2009).

Park, H.S., et al., "Modularized charge equalization converter with high power density and low voltage stress for HEV lithium-ion battery string," 7th International conference on power electronics, pp. 784-789, (Oct. 2007).

Peter, P.K, and Agarwal, V., "Analysis and design of a gound isolated buck switched capacitor dc-dc conveter," IEEE International symposium on industrial electronics, pp. 632-637 (Jul. 2010).

Sack, T.T. et al., "Segmented battery charger for high energy 28 v lithium ion attery," IEEE Aerospace and Electronic Systems Magazine, vol. 16, No. 9, pp. 15-18 (Sep. 2001).

Salas, V., et al., "Review of the maximum power point tracking algorithms for stand-alone photovoltaic systems," Solar energy Materials & Solar Cells, vol. 90, Issue 11, pp, 1555-1578 (Jul. 2006).

Seeman, M. D., S. R., "Analytical and practical analysis of switched capacitor DC-DC converters," Electrical Engineering and computer science, University of California at Berkley, pp. 66 (Sep. 1, 2006).

Welsh, J. D., "A comparison of active and passive cell balancing techniques for series/parallel battery packs," A thesis presented in partial fulfillment of the requirements for the degree master of science in the graduate school of the Ohio State University, pp. 115 (2009).

* cited by examiner

PHOTO-VOLTAIC ARRAY FED SWITCHED CAPACITOR DC-DC CONVERTER BASED BATTERY CHARGING FOR LI-ION BATTERIES

CROSS-REFERENCE TO RELATED APPLICATION

This Application is the National Stage filing under 35 U.S.C. §371 of PCT Application No. PCT/IB11/01169 filed on May 30, 2011, which claims priority under 35 U.S.C. §119(a) and (b) to Indian Patent Application No. 849/MUM/2011 filed on Mar. 23, 2011. The disclosure of the PCT Application and the Indian Patent Application are hereby incorporated by reference in their entireties.

BACKGROUND

Unless otherwise indicated herein, the materials described in this section are not prior art to the claims in this application and are not admitted to be prior art by inclusion in this section.

Lithium-ion (Li-Ion) batteries are a popular choice for portable devices such as laptop computers, handheld computers, and similar devices because of their high energy density compared with other types batteries (e.g., Nickel-Cadmium batteries), their low self-discharge cycle, and absence of memory effects resulting in easier maintenance. Li-Ion batteries also have high charge-discharge efficiency (approximately 90%) and a relatively high nominal discharge voltage (e.g., 3.7 V). In applications where a supply voltage needs to be more than what can be obtained from a single battery cell, a battery pack including a plurality of serially-connected cells may be used.

The present disclosure appreciates that there are several limitations with conventional Li-Ion battery charge/discharge techniques. For example, in Li-Ion batteries the cell electrolyte breakdown is substantially near a full charge voltage (e.g., 4.2 V). Differences in internal impedance, uneven temperature distribution during usage, variations in the manufacturing processes, and aging may result in a difference in the characteristics of individual Li-Ion cells forming a battery during charge and discharge cycles. During the charging phase, these differences may result in some cells of the serially-connected battery pack becoming charged to the End of Charge (EoC) voltage faster than the remaining cells. Overcharge of these Li-Ion cells may lead to electrolyte fire, thermal runaway, or in a worst case scenario, an explosion. Similarly, during the discharge cycle, weaker cells may reach the End of Discharge (EoD) voltage earlier than the remaining cells. Over discharge of a cell (e.g., cell voltage<2.7 V) during the discharge phase may result in cell reversal and premature failure.

Alternative approaches to overcome the limitations of conventional Li-Ion battery charging/discharging techniques may include terminating the charging process as soon as any one cell voltage of the battery pack reaches the EoC voltage to prevent the weaker cells from being overcharged. This approach, in turn, may result in partial charging of the remaining cells in the battery pack lowering the overall battery capacity. To prevent cell reversal and consequent permanent cell damage, the battery may have to be disconnected from the load immediately resulting in the maximum battery capacity not being utilized. The battery capacity may thus be determined by the weakest cell of the battery pack.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

The present disclosure generally describes techniques for photo-voltaic array fed switched capacitor dc-dc converter based battery charging for li-ion batteries. In some examples, a method for balancing and charging a plurality of cells of a battery is described. An example method may include selecting a battery cell with a lowest cell voltage for charging, determining if a power source is active, and charging the selected battery cell for a predefined period employing a maximum power point tracking (MPPT) scheme if the power source is active. Another battery cell may be selected for charging upon the cell voltage of the selected battery reaching a predefined value and/or the predefined period expiring.

The present disclosure also describes a charging device adapted to balance and charge a battery comprising a plurality of battery cells. An example charging device may include a control circuit and a charging circuit. The control circuit may be adapted to select a battery cell with a lowest cell voltage for charging, determine if a power source is active, and cause a charging circuit to charge the selected battery cell if the power source is active. Another battery cell may be selected to be charged upon the cell voltage of the selected battery reaching a predefined value and/or a predefined period expiring. The charging circuit may be adapted to charge the selected battery cell for the predefined period employing a maximum power point tracking (MPPT) scheme.

The present disclosure further describes computer-readable storage medium having instructions stored thereon for controlling a charging device adapted to balance and charge a battery with a plurality of battery cells. According to some examples, the instructions may include monitoring a plurality of cells until a cell voltage of at least one battery cell is detected below a predefined value, selecting the battery cell with a lowest cell voltage for charging, determining if a power source is active, and causing the charging device to charge the selected battery cell for a predefined period employing a maximum power point tracking (MPPT) scheme if the power source is active. Another battery cell may be selected for charging upon the cell voltage of the selected battery reaching the predefined value and/or the predefined period expiring, and a balancing period set for the selected battery cell if the power source is inactive. The instructions may also include causing the charging device to perform cell balancing, monitoring cell voltages of the battery cells, and selecting another battery cell for charging upon a cell voltage of a currently charged battery cell reaching the predefined value and/or the balancing period expiring.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
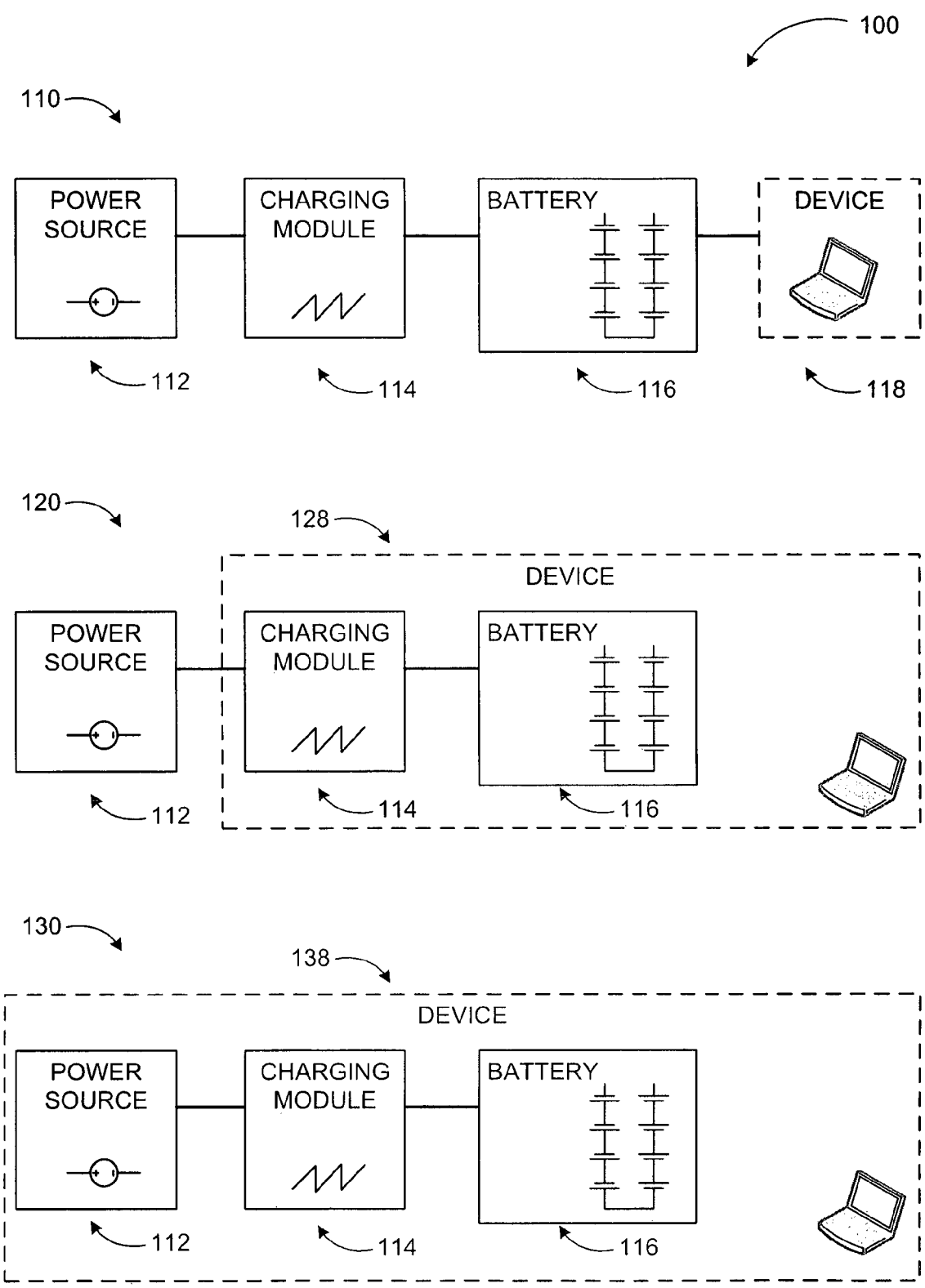
FIG. 1 illustrates example configurations for a Li-Ion battery charging system according to at least some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to photo-voltaic array fed switched capacitor dc-dc converter based battery charging for li-ion batteries.

Briefly stated, technologies generally described herein relate to a cell balancing scheme for a serially coupled Li-Ion battery pack supported by a photovoltaic cell array power source. A switched capacitor DC-DC converter and a cell monitoring approach may be used to charge and cell balance the battery pack. When one of the cells falls below a predefined voltage, a capacitor (charged by the photovoltaic array) may supply current to bring the voltage to the predefined point. Continuous monitoring for the cells during, charging and discharging may ensure cell voltage changes beyond the predefined limit are detected timely. Cell balancing may be performed even in the absence of photovoltaic (PV) array illumination.

FIG. 1 illustrates example configurations for a Li-Ion battery charging system, arranged according to at least some embodiments described herein. Li-Ion batteries may be used to provide rechargeable power supply to a wide variety of electronic devices. In addition to commonly known examples such as laptop computers, notebook computers, tablet computers, handheld computers, and the like, electronic devices using Li-Ion batteries may include cameras, media players (audio, video), communication devices (e.g., two-way radios, smart phones), and many more.

Diagram 100 depicts three example configurations for an example laptop computer. In example configuration 110, device 118 may be coupled to an external battery pack 116 comprising serially coupled battery cells, which in turn may be coupled to a separate charging module 114. The charging module 114 may be configured to receive power to charge the battery pack 116 from a power source 112. Power source 112 may be an Alternative Current (AC) source (e.g., power network), a Direct Current (DC) source (e.g., a vehicle outlet or another battery), a photovoltaic array, and/or some other comparable source.

In example configuration 120, battery pack 116 and charging module 114 may be an integrated part of the device 118. For example, in a typical laptop computer, the battery may be an integral part of the computer (albeit removable) and the charging module 114 may be integrated into the circuitry of the computer. Power source 112 may be external in this configuration.

In example configuration 130, all illustrated components may be integrated. For example, device 118 may include an integrated PV array (e.g., a PV array built on the back of a laptop computer's cover). Of course, other configurations and components may also be employed in a Li-Ion battery charging system according to some embodiments. For example, the system may be configured to receive DC power from a Power-over-Ethernet (PoE) system to charge the battery pack.

A system according to various embodiments may be adapted to incorporate charging and cell balancing functionalities in the same hardware. Furthermore, a power supply voltage may be lower than a battery voltage in a system according to some embodiments. In applications, where the power source is a PV array, the array size may be minimized as the array voltage can be lower than the battery voltage enabling weight reduction and miniaturization of the power source. In some embodiments, a ground isolated Switched Capacitor (SC) converter may be configured for battery charging and cell balancing allowing avoidance of bulky magnets for energy transfer and isolation. In contrast to passive methods for cell balancing, dissipative elements may not be needed such that simpler and more compact thermal designs are possible. By performing cell balancing in charge and discharge cycles, battery backup time and battery life may be extended. Battery life may be further extended by ensuring substantially same state of charge (SoC) for all cells through a maximum power point tracking (MPPT) algorithm. The MPPT algorithm may be utilized to facilitate power source voltage measurements without power source current measurements whereby the need to insert lossy series resistors in the current path may be eliminated such that more power may be extracted for use in PV array applications.

Figure 2:
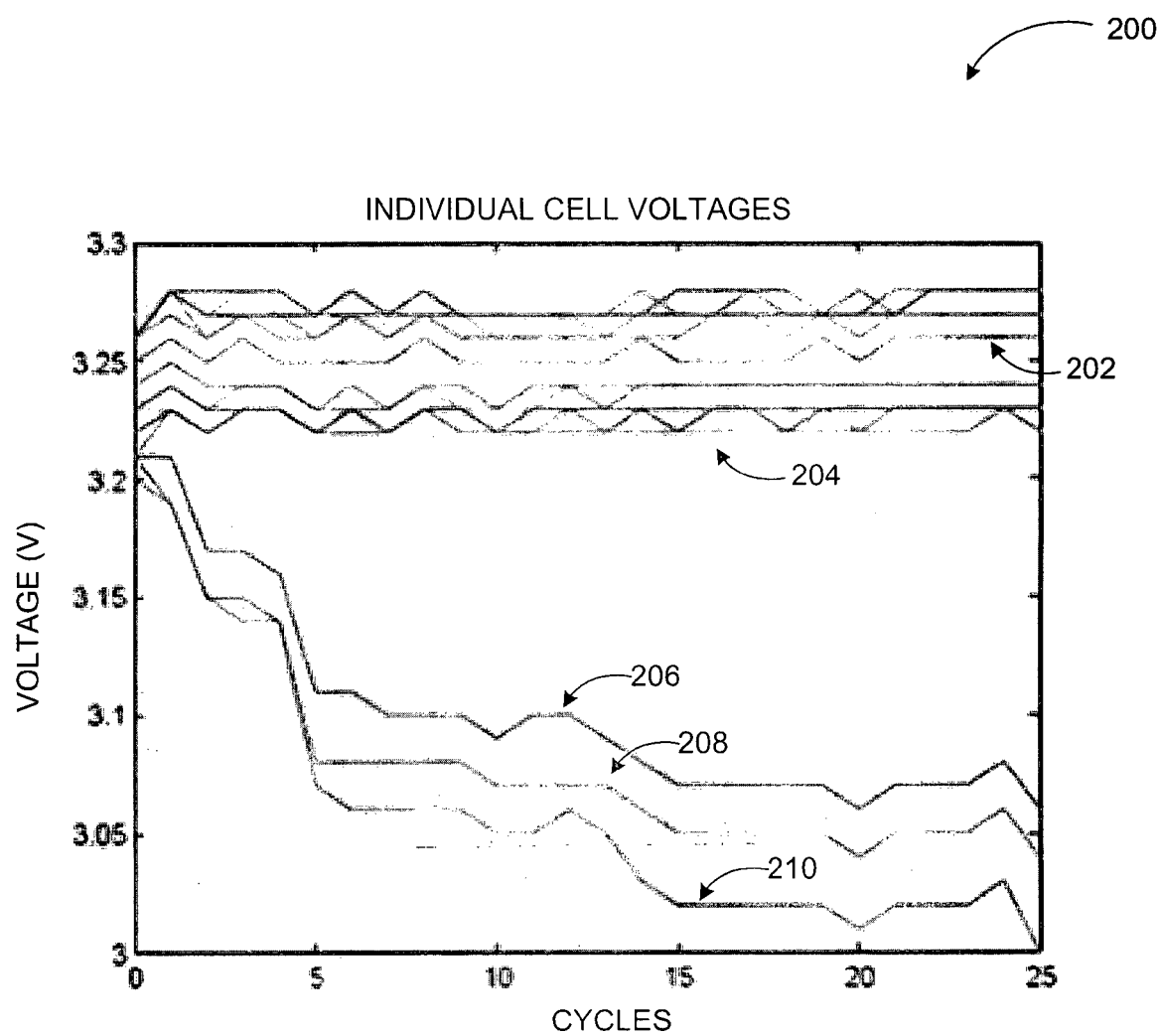
FIG. 2 illustrates an example diagram depicting deviation of individual cell voltages of weak cells in a series coupled battery pack.

FIG. 2 illustrates an example diagram depicting deviation of individual cell voltages of weak cells in a series coupled battery pack, arranged according to at least some embodiments described herein. As depicted in diagram 200, dissimilarities in the cells of a serially coupled pack may become more pronounced with increase in the charge-discharge cycles. The voltages of three weak cells (206, 208, and 210) of an example battery pack including many cells may start to drift rapidly from the rest of the cell voltages (e.g., 202 and 204) just after about five cycles.

A Photo Voltaic (PV) array fed Switched Capacitor (SC) DC-DC converter based Li-Ion battery charging system according to at least some embodiments may be configured to facilitate charging a battery with a PV array that has a lower voltage than the battery voltage. A ground isolated buck type SC DC-DC converter may be configured to generate a floating voltage that is used to charge the cells of a series coupled multi-cell battery pack, one cell at a time. A duty cycle of the buck converter may be adjusted to track the array's maximum power point (MPP). Cell voltages may be monitored and active cell balancing performed by charging one cell at a time both during the charge and discharge cycles, which ensures a substantially same state of charge for all cells at all instances.

To ensure that no cell in a serially coupled Li-Ion battery pack is overcharged or over-discharged, cell balancing may be employed. The cell balancing scheme may facilitate use of the full battery capacity and prevent limitation of the battery capacity by the capacity of the weakest cell in the serially coupled batter pack. Cell balancing may be employed during the charging and/or discharging cycle. During the charging cycle, the cells reaching the EoC voltage earlier than the other cells may be deprived of any further charge current preventing their overcharge. Similarly, during the discharge phase, the cells reaching the EoD voltage earlier than the remaining cells of the pack may be charged so that their voltage falls more slowly than it would have without the cell balancing scheme.

Figure 3:
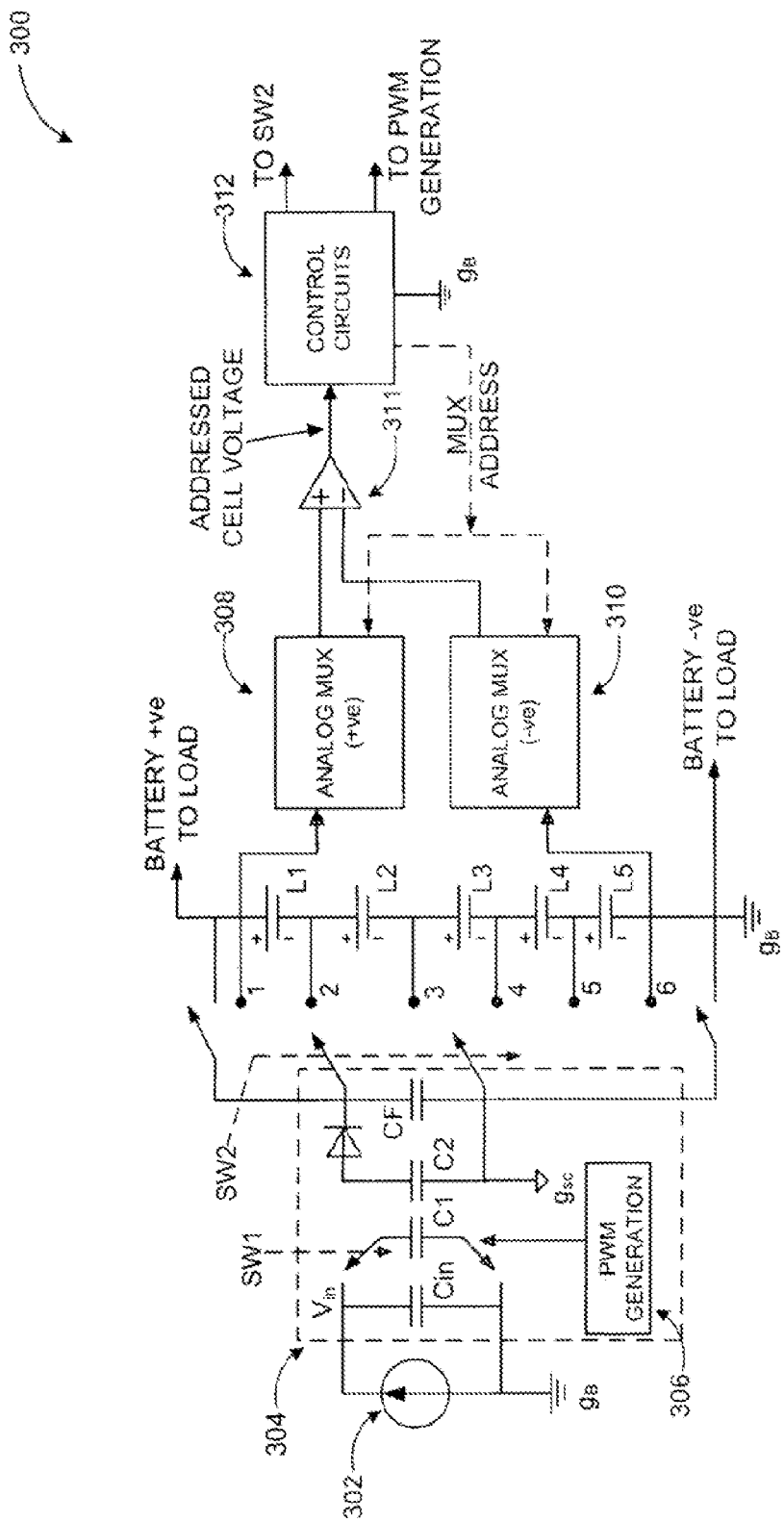
FIG. 3 illustrates a schematic diagram of an example ground isolated switched capacitor dc-dc converter based maximum power point tracking battery charging and cell balancing mechanism.

FIG. 3 illustrates a schematic diagram of an example ground isolated switched capacitor DC-DC converter based maximum power point tracking battery charging and cell balancing mechanism, arranged according to at least some embodiments described herein.

The example mechanism depicted in diagram 300 assumes an example Li-Ion battery including five serially coupled cells. Embodiments are not limited to the example illustrations, however, and may be implemented with any number of cells. The battery voltage $V_B$ of the fully charged battery is five times the cell voltage of each cell. The charge power may be provided by a solar array with a maximum power point voltage $V_{mp}$ and current $I_{mp}$, where maximum power point voltage $V_{mp}$ may be below battery voltage $V_B$. The power source in diagram 300 is illustrated as a current source 302.

The power conversion section 304 may be implemented with a switch SW1, and capacitors Cin, C1 and C2. Current source 302 initially charges capacitor Cin to some voltage. Switch SW1 may be adapted to first couple capacitor C1 to capacitor Cin, where the charge stored on Capacitor Cin is transferred to capacitor C1, which may charge to the voltage across capacitor Cin. Then, SW1 may be adapted to decouple capacitor C1 from capacitor Cin, and couple capacitor C1 to capacitor C2, at which time capacitor C1 may transfer the stored charge from capacitor C1 to capacitor C2. A delay time may be introduced between the time that switch SW1 is configured to couple capacitor C1 to capacitor Cin and the time that switch SW1 is configured to couple capacitor C1 to capacitor C2 to ensure that the solar array/battery ground $g_B$ is not coupled to the SC converter output ground $g_{sc}$. The isolation of the grounds may ensure that the SC converter output voltage $V_o$ is truly floating.

A PWM generation circuit 306 may be adapted to control the switch SW1 at a predefined frequency (e.g., 50 kHz). The duty cycle of the switch SW1 may be varied in response to a control signal from the control circuit 312. The control circuit 312 may be configured to scan the voltages of the cells L1 to L5 using analog multiplexers 308 and 310, which can be selectively activated using address from the control circuit 312. Outputs of the analog multiplexers 308 and 310 may be combined at a differential amplifier 311 prior to being provided to the control circuit 312 as input.

According to an example scenario, the voltage of cell L3 may be the lowest voltage among the battery cell voltages. The output of the power conversion section 304 may be coupled to cell L3 by coupling switch SW2 to 3 and 4 for a predefined period of time (e.g., about two minutes), which may be controllable by control circuits 312 or an external control input. Cell L3 can be charged continuously for this period of time. While the cell is being charged, the charging may be immediately terminated and the control circuit may again scan for another cell with the lowest voltage if the cell voltage is determined to exceed the EoC voltage. If cell L3 has not yet reached EoC, the charging may be continued for another period of time and then the control circuit 312 may scan the cell voltages to determine the cell with the lowest voltage. The next selected cell may then be continuously charged for the predefined period. The routine may be repeated until all cells reach the EoC voltage. This charging approach ensures that the cells reach the EoC together and at any point of time the SoC of the cells is almost the same. Cell balancing and battery charging may, thereby, be ensured with a PV array whose voltage is lower than the battery voltage. Cell balancing may also be performed during the battery discharge phase. In the absence of illumination of the power source, the cell balancing may be accomplished by the flying capacitor method using CF, where CF may be first coupled across the entire battery and then discharged into a battery cell with the lowest voltage by selectively activating SW2. Thus, cell balancing may be performed in the presence or absence of illumination of the power source ensuring that all cells of the series battery pack are at the same State of Charge (SoC) at all instances.

Figure 10:
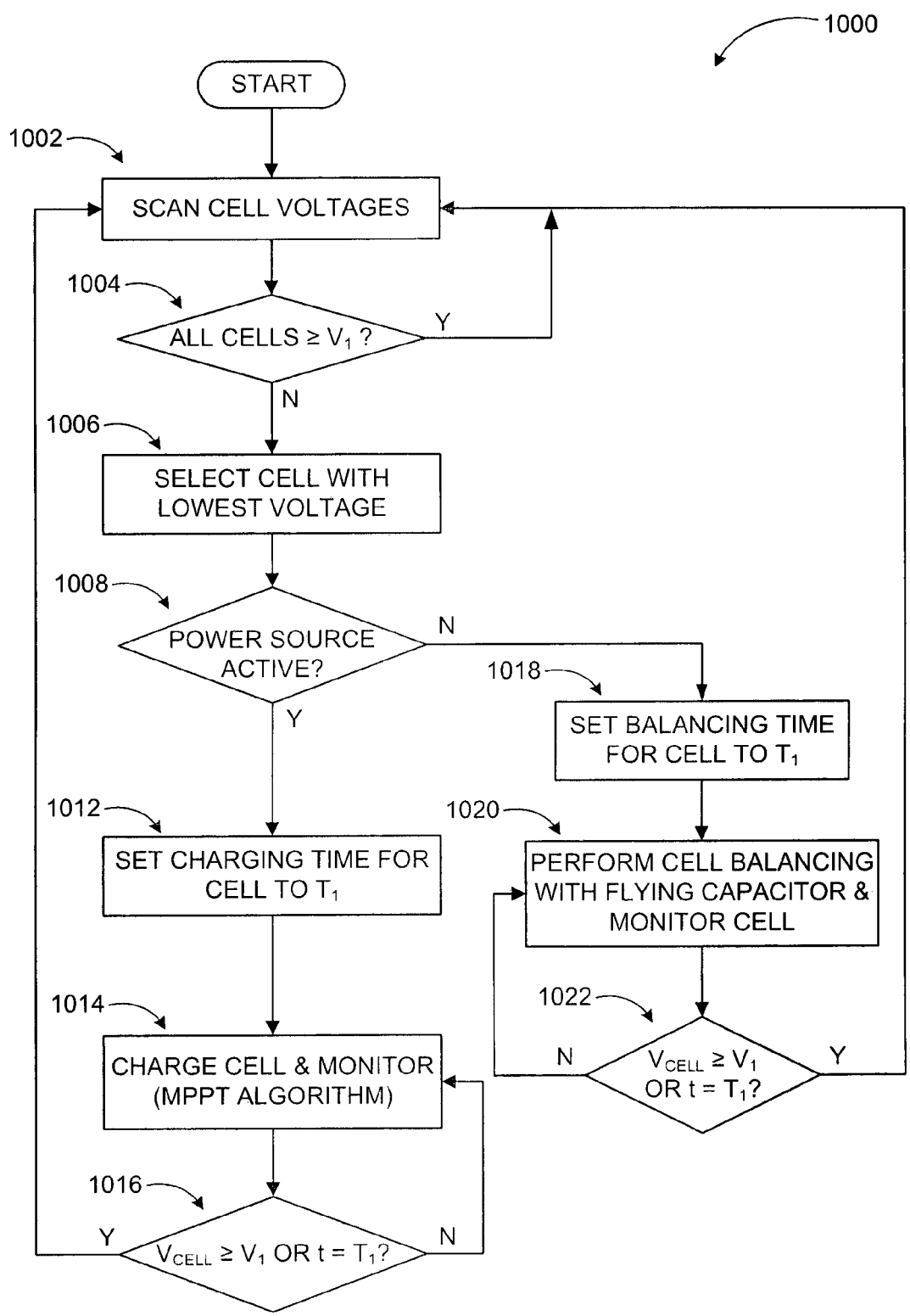
FIG. 10 is a flow diagram illustrating an example method that may be performed by a processor controlling a battery charging device, such as processor 910 in FIG. 9.
Figure 11:
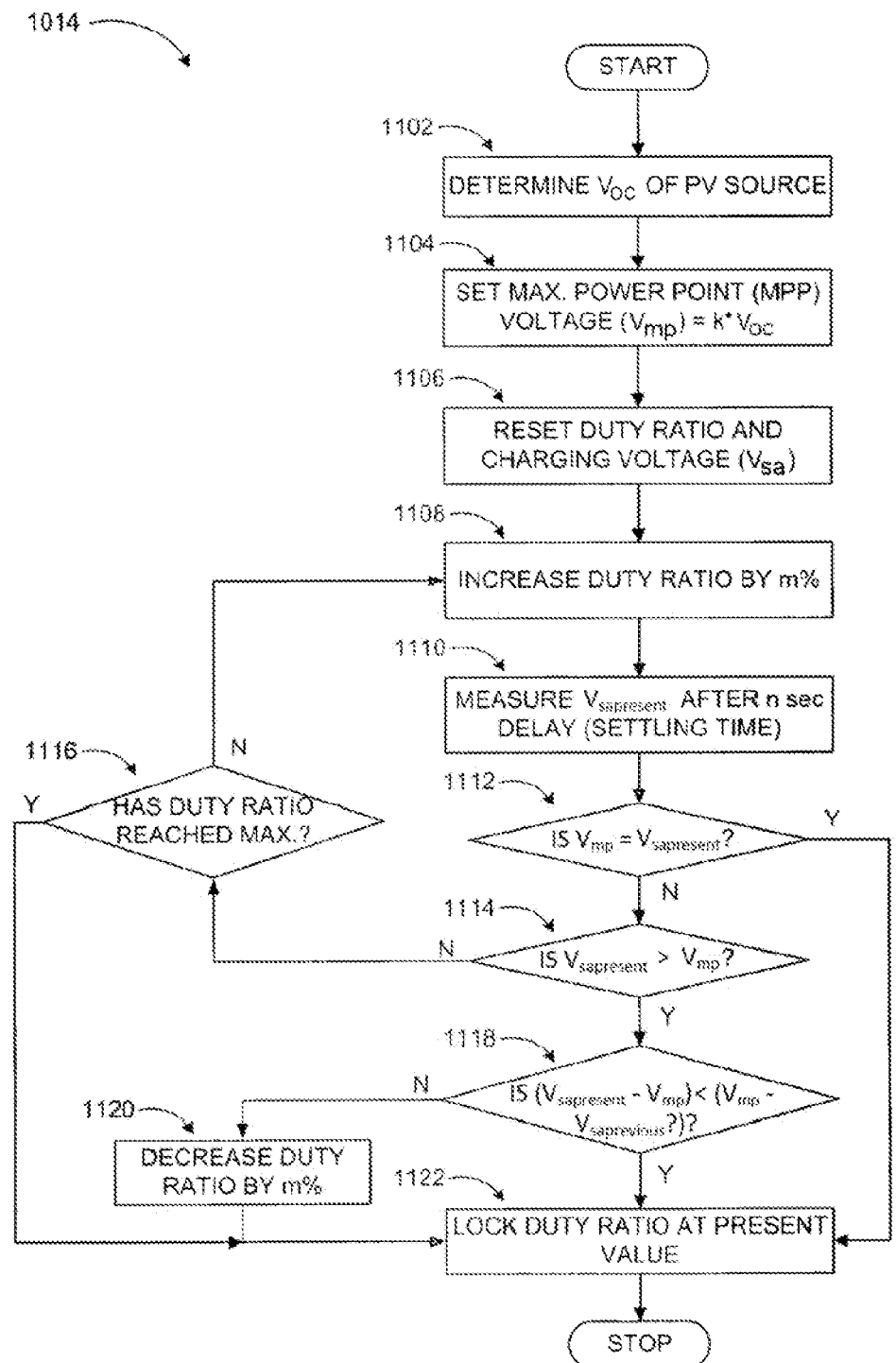
FIG. 11 illustrates a flow diagram illustrating an example maximum power point tracking method as part of the process of FIG. 10 that may be performed by a processor controlling a battery charging device, such as processor 910 in FIG. 9.

The power conversion section 304 may be controlled by hardware, software, or a combination of the two. In case of software, a program may be executed by a controller type of device such as a microcontroller or microprocessor, which may be used for the other control functions of the system powered by the batteries. Such an algorithm may include a loop (as shown in FIG. 10) configured to scan cell voltages by setting the appropriate address to the analog multiplexers, checking whether each cell voltage has reached the EoC voltage, and if all cells are charged to the EoC voltage continuing to monitor the voltages of the individual cells. To extract maximum power from the solar array, a branch of the algorithm may be configured to execute Maximum Power Point Tracking (MPPT) as shown in FIG. 11.

Switched Capacitor DC-DC converters can accomplish power conversion with the help of capacitors that are electronically switched between the input power source and the output load. The absence of inductors and transformers in SC DC-DC converters can enable lighter weight, smaller space consumption, and/or higher power density. Furthermore, the control circuits and switches of an SC DC-DC converter may be fabricated in a single monolithic chip. Due to their compactness, SC DC-DC converters are increasingly used in a wide range of products ranging from mobile phones to portable computers. Some of the other applications of SC converters are charge pump based gate drives and RS 232 level converters for data transfer. The introduction of ground isolation in SC DC-DC converters without the use of transformers and inductors can be utilized to enable use of SC DC-DC converters to power noise sensitive low power loads.

The control circuit 312 may be adapted to monitor each cell's terminal voltage which is an indicator of the cell's SoC. Two analog multiplexers may be used to couple the selected cell to the control circuit 312 through a differential amplifier 311 as discussed above. The cell +ve's may be routed through one of the multiplexers and the cell −ve's may be routed through the other multiplexer. A desired cell may be selected by an appropriate address from the control circuit 312, which may execute the software for battery charging, cell balancing and MPPT. Control circuit 312 may be configured to communicate an appropriate address to the analog multiplexers to facilitate the selection of a cell voltage for monitoring, wherein the cell with the lowest cell voltage can be selected for charging. Cells may be balanced in the charge and discharge cycles. MPPT may be achieved by monitoring and computing maximum power point voltage $V_{mp}$ and generating the error signal for duty cycle control.

A SC DC-DC converter based Li-Ion battery charging and balancing system may be implemented with circuits other than those shown in FIG. 3 (and FIG. 7) using the principles described herein. Such circuits may include additional or fewer components. Moreover, the components of the circuits may be embodied using various methods such as MOSFET (Metal Oxide Semiconductor Field Effect Transistor) based switches and/or capacitors, non-MOSFET based switches and/or capacitors, integrated circuits, or various discrete elements, and so on.

Figure 4:
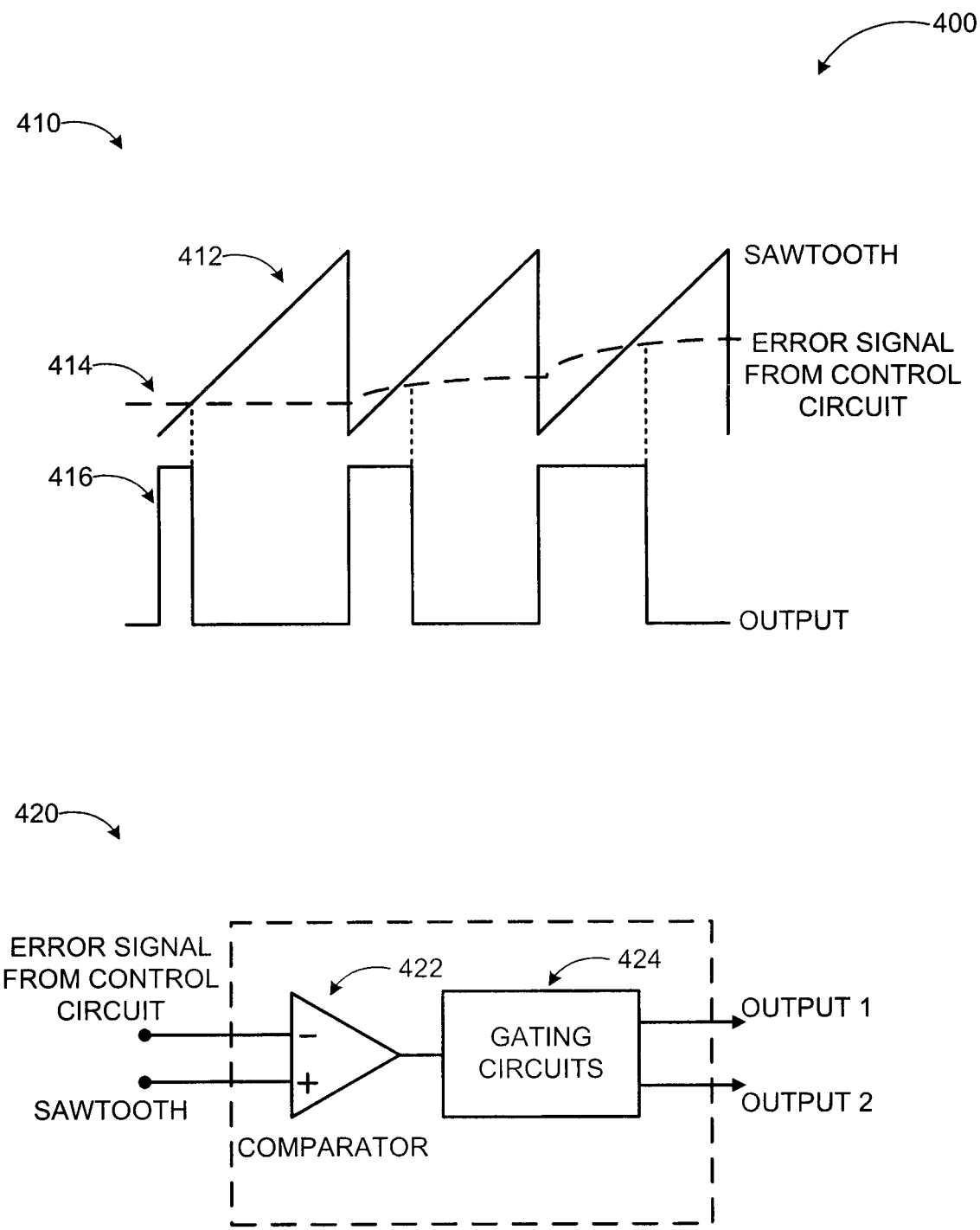
FIG. 4 illustrates drive signal generation by a power management controller in response to input from control circuit.

FIG. 4 illustrates drive signals that can be generated by a power management controller in response to input from a control circuit, in accordance with at least some embodiments described herein. A PV array has an exponential relationship between current and voltage, and the maximum power point (MPP) occurs at the knee of the curve, where the resistance is approximately equal to the negative of the differential resistance ($V/I = -dV/dI$). Maximum power point tracking circuits are DC-DC converters that make use of a control circuit to search for the MPP. MPP tracking circuits enable extraction of maximum power available from a PV array by transforming the load resistance to the resistance of the array at the maximum power point enabling the array to deliver power to the load at the maximum power point voltage ($V_{mp}$) and maximum power point current ($I_{mp}$) such that the product $V_{mp} \times I_{mp}$ is maximum.

According to some embodiments, a pulse width modulation (PWM) controller may be employed to manage a duty cycle of the DC-DC converter. As shown in diagram 420, an external error signal generated by the PWM controller may be fed to a comparator 422 of the PWM controller as input. The comparator output may be generated after comparison with an internally or externally generated saw tooth waveform. Following one or more gating operations at gating circuits 424 within the PWM controller, two complementary output signals, output 1 and output 2, may be provided to the converter. According to one example implementation, the duty cycle may vary at output 1 (or output 2) of the PWM controller in a range from about 0% to about 45% when the input to the comparator 422 generated by the PWM controller varies in another range from about 0.9 V to about 3.4 V with a sensitivity of 2.5% increase/decrease per 0.2V increase/decrease in the control signal (i.e., error signal). Diagram 410 illustrates an example saw tooth waveform 412, an error signal 414, and a corresponding output signal 416. The duty cycle of the converter may be controlled by the output signal 416, which is adjusted in response to the incremental change in the error signal 414.

Figure 5:
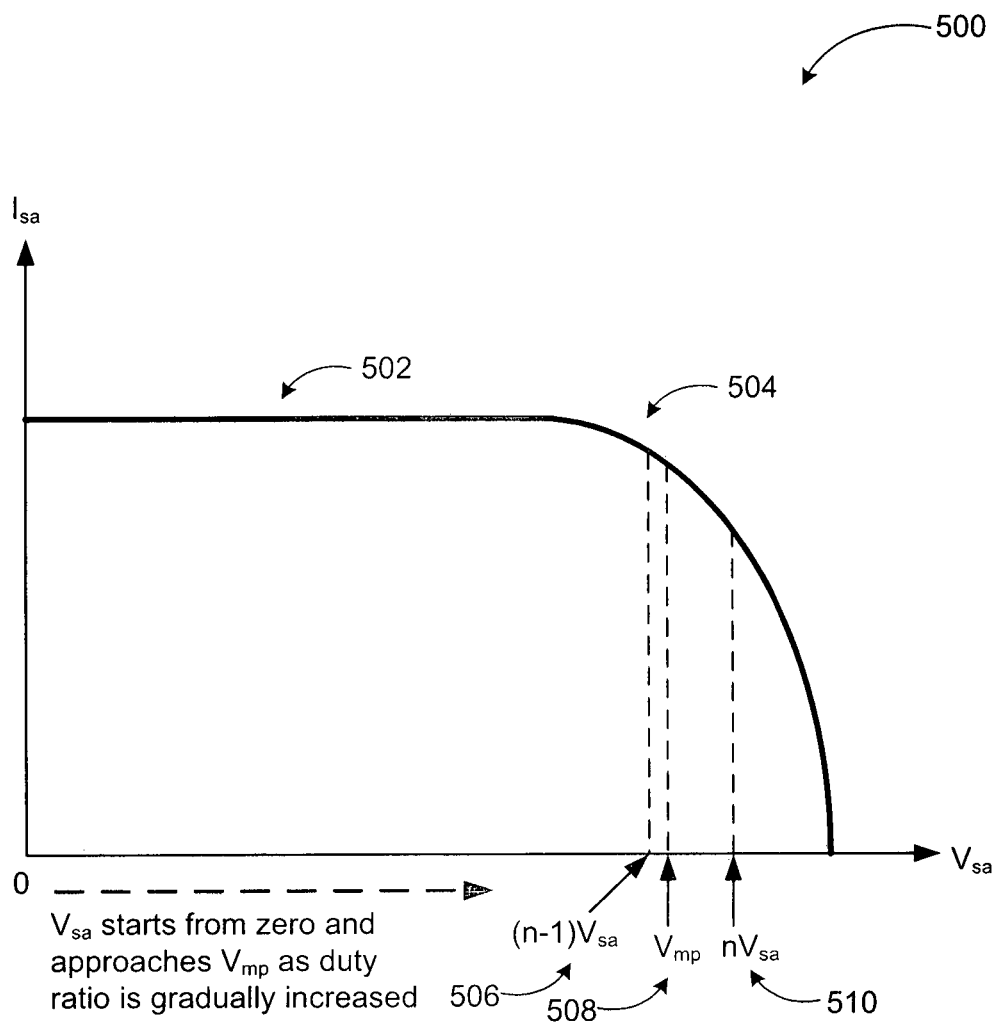
FIG. 5 illustrates an example maximum power point tracking by gradually increasing the duty ratio.

FIG. 5 illustrates an example maximum power point tracking by gradually increasing the duty ratio according to at least some embodiments described herein. The duty cycle for tracking the MPP of the PV array may depend not only on the incident solar radiation but also on the coupled load. Hence, MPPT may be performed for each cell of the battery as the terminal voltage and impedance of each cell may be different from one another. The duty cycle may be reset initially and then increased in predefined steps by incrementing the error signal to the PWM controller's comparator input shown in FIG. 4.

Diagram 500 illustrates waveform 502 of charging current, $I_{sa}$, vs. charging voltage, $V_{sa}$. The charging voltage can be incrementally increased (by the increase in the duty cycle) such that it may approach MPP voltage 508. The PWM controller may be adapted to measure the charging voltage at each increment and compare against the MPP voltage. If a measured charging voltage ($(n-1)V_{sa}$ 506) is below maximum power point voltage $V_{mp}$, the duty cycle may be continued to be incremented. If another measured charging voltage ($nV_{sa}$ 510) is determined to be above maximum power point voltage $V_{mp}$, the duty cycle may be decremented.

Figure 6:
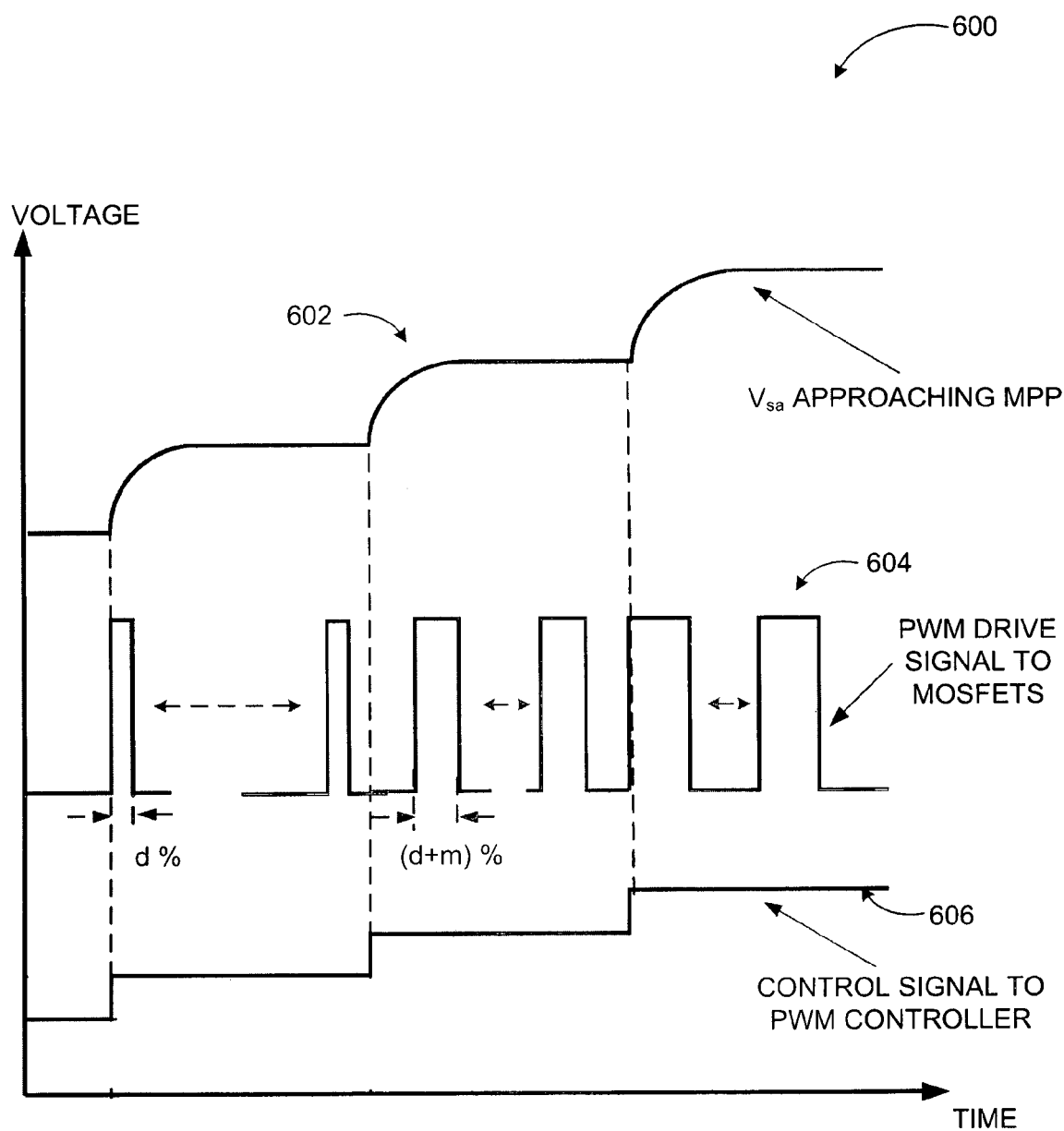
FIG. 6 illustrates example variation of power management control signal, power management drive signal, and charging voltage with time.

FIG. 6 illustrates example variation of a power management control signal, a power management drive signal, and a charging voltage with time, in accordance with at least some embodiments described herein.

Diagram 600 shows the charging voltage, $V_{sa}$ 602, approaching the maximum power point voltage, $V_{mp}$, over time. As the control signal 606 from the PWM controller is incremented up, the duty cycle of the DC-DC converter is incremented through PWM drive signal 604. Initially, the duty cycle may be reset to a predefined value (d %) as discussed above, then with each increase in value of the control signal 606, the duty cycle may be incremented by a fixed amount m (e.g., 2.5%). The incremental increase in the duty cycle, in turn, may result in the incremental increase in the charging voltage 602. The charging voltage $V_{sa}$ may be measured and compared to the computed maximum power point voltage $V_{mp}$ after a predefined settling time (e.g., about 10 ms).

With successive duty cycle increments, one of the following may be possible: (1) the present charging voltage $V_{sa}$ may be about equal to maximum power point voltage $V_{mp}$, which may result in locking the duty cycle at the present value; (2) the present charging voltage $V_{sa}$ may be less than the computed maximum power point voltage $V_{mp}$, in which case the duty cycle may be incremented if a maximum limit for the duty ratio has not been reached yet; (3) if the present charging voltage $V_{sa}$ is more than the computed maximum power point voltage $V_{mp}$ and if the previous charging voltage $V_{sa}$ is closer to the maximum power point voltage $V_{mp}$, then the duty cycle may be decremented by a fixed amount and locked at this point; (4) for some load and panel illumination/temperature conditions, it may not be possible to reach the MPP even when the duty cycle reaches the maximum limit, the duty cycle may be locked at a maximum value in such situations. The MPPT algorithm discussed in conjunction with FIG. 11 may address these different conditions.

Figure 7:
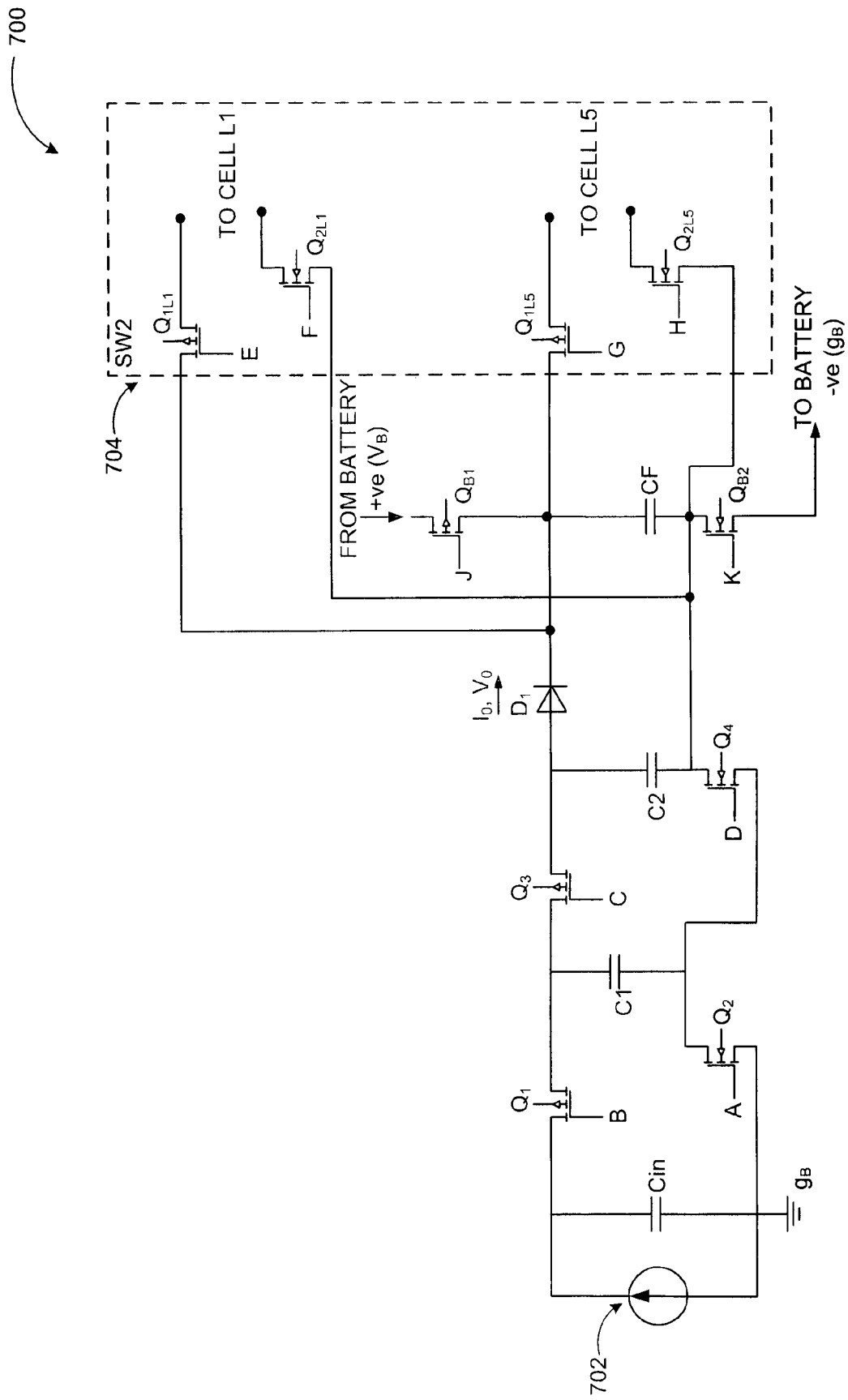
FIG. 7 illustrates a schematic diagram of a photo-voltaic array fed ground isolated switched capacitor DC-DC converter with power management based on maximum power point tracking (MPPT)

FIG. 7 illustrates a schematic diagram of a photo-voltaic array fed ground isolated switched capacitor DC-DC converter with power management based on maximum power point tracking (MPPT), in accordance with at least some embodiments described herein.

As shown in diagram 700, a flying capacitor based cell balancing scheme may be activated in the absence of array illumination according to some embodiments. During the time when the PV array is illuminated, cell balancing and charging may occur as discussed in conjunction with FIG. 3. The flying capacitor CF and associated switches QB1 (e.g., p-channel MOSFET) and QB2 (e.g., n-channel MOSFET) along with their respective drive circuits (not shown in diagram) may be placed between capacitor C2 and the second switch SW2 (704). The presence of capacitor Cin across the PV array (symbolized by current source 702) may be utilized to ensure that a voltage source $V_{in}$ is available as the input to the SC converter. The function of switch SW1 may be realized with four MOSFETs Q1, Q2, Q3, and Q4. MOSFETs Q1 and Q3 may be p-channel enhancement mode MOSFETs and MOSFETs Q2 and Q4 may be n-channel enhancement mode MOSFETs according to one example implementation. Capacitors C1 and C2 may be implemented as low ESR ceramic capacitors capable of handling large repetitive current surges.

Values for capacitors C1 and C2 may be expressed as:

$$C1 = \Delta Q/(V_{in} - V_o), \quad [1]$$

and $$C2 = (I_o * t1)/\Delta V_r, \quad [2]$$

where t1 is the time period for which C2 supports the load. If t2 is the time period over which C2 is charged by C1 and $\Delta V_r$ is the output ripple voltage, the charge lost, $\Delta Q$, by capacitor C1 in the time period t2, may be expressed as:

$$\Delta Q = (I_o * t2) + (C2 * \Delta V_r). \quad [3]$$

Switch SW2 (704) for coupling the charging circuit to the individual battery cells may include a pair of MOSFETs (e.g., $Q_{1L1}/Q_{2L1}$ through $Q_{1L5}/Q_{2L5}$) for each switching function. A Schottky diode D1 may be configured to prevent cell discharge into the SC converter output section. To select a particular cell, for example L1, the control circuit may be configured to selectively activate MOSFETs $Q_{1L1}$ (p-channel) and $Q_{2L1}$ (n-channel).

In an example scenario, cell L5 may be assumed to be the weakest during battery discharge in the absence of illumination and its voltage may be assumed to fall at a faster rate than the voltage of the other cells in the battery pack. Cell balancing may be performed to boost the voltage of L5. In the absence of PV illumination, the cell balancing may be implemented by the flying capacitor method. Capacitor CF may be first coupled across the battery by selectively activating the MOSFETs QB1 and QB2 with control signals J and K. Charge may be coupled to capacitor CF through MOSFETs QB1 and QB2 resulting in capacitor CF charging to a voltage $V_B$. Next, the control circuit may turn selectively activate the MOSFETs $Q_{1L5}$ and $Q_{2L5}$ with gate drives G and H. Capacitor CF may discharge via conduction through MOSFET $Q_{1L5}$ and $Q_{2L5}$ into cell L5, such that the voltage of cell L5 is effectively boosted. The process of receiving the charge with the flying capacitor CF from the entire battery and discharging into a particular cell with the lowest cell voltage may be performed at a frequency f for fixed time duration or until the particular cell voltage reaches EoC.

The charge $\Delta Q$ delivered to a particular cell at voltage $V_L$ from the battery at $V_B$ during one cycle may be expressed as:

$$\Delta Q = CF * (V_B - V_L). \quad [4]$$

If the process of charge transfer is performed at frequency f, then the current $I_{CB}$ at which cell balancing occurs may be given by:

$$I_{CB} = f * \Delta Q = f * CF * (V_B - V_L). \quad [5]$$

Switch SW2 (704) for coupling the charging circuit to the individual battery cells may include a pair of MOSFETs (e.g., $Q_{1L1}/Q_{2L1}$ through $Q_{1L5}/Q_{2L5}$). A Schottky diode D1 may be configured to prevent cell discharge into the SC converter output section. To select a particular cell, for example L1, the control circuit may selectively activate MOSFETs $Q_{1L1}$ (p-channel) and $Q_{2L1}$ (n-channel).

SC converter based systems may be better suited for low power systems involving relatively smaller currents. To increase the current capability, two or more SC converters may be operated in parallel in a time-interleaved manner. A charge efficiency of a battery may depend on the current at which a battery is being charged. For example, if it takes 10 hours to fully charge a battery at a rate of C/10, it may take more than 20 hours to fully charge the battery at a rate of C/20. This is because the chemistry of the battery is such that it may accept charge at a faster rate when the charging current is higher. When a depleted battery has to be recharged and readied for the next discharge cycle in the shortest possible time, it may be desirable to charge a battery at a higher current rather than at a lower current. Considering an example case of a Li battery made of a plurality of 2 A Li-Ion cells, charging the battery at a high current rate may amount to charging it with a charge current of 0.5 A (C/4 rate). Charging the same battery with a charge current of 0.1 A (C/20 rate) may amount to charging it at a low current rate. Considering another example case of a PV array at an average voltage of 10 V and an average current of 150 mA, the voltage may need to be boosted by a factor of about three times with a charge pump, leading to a decrease in the charging current, to charge the battery to 21 V. Of course, embodiments are not limited to these illustrative example values.

Figure 8:
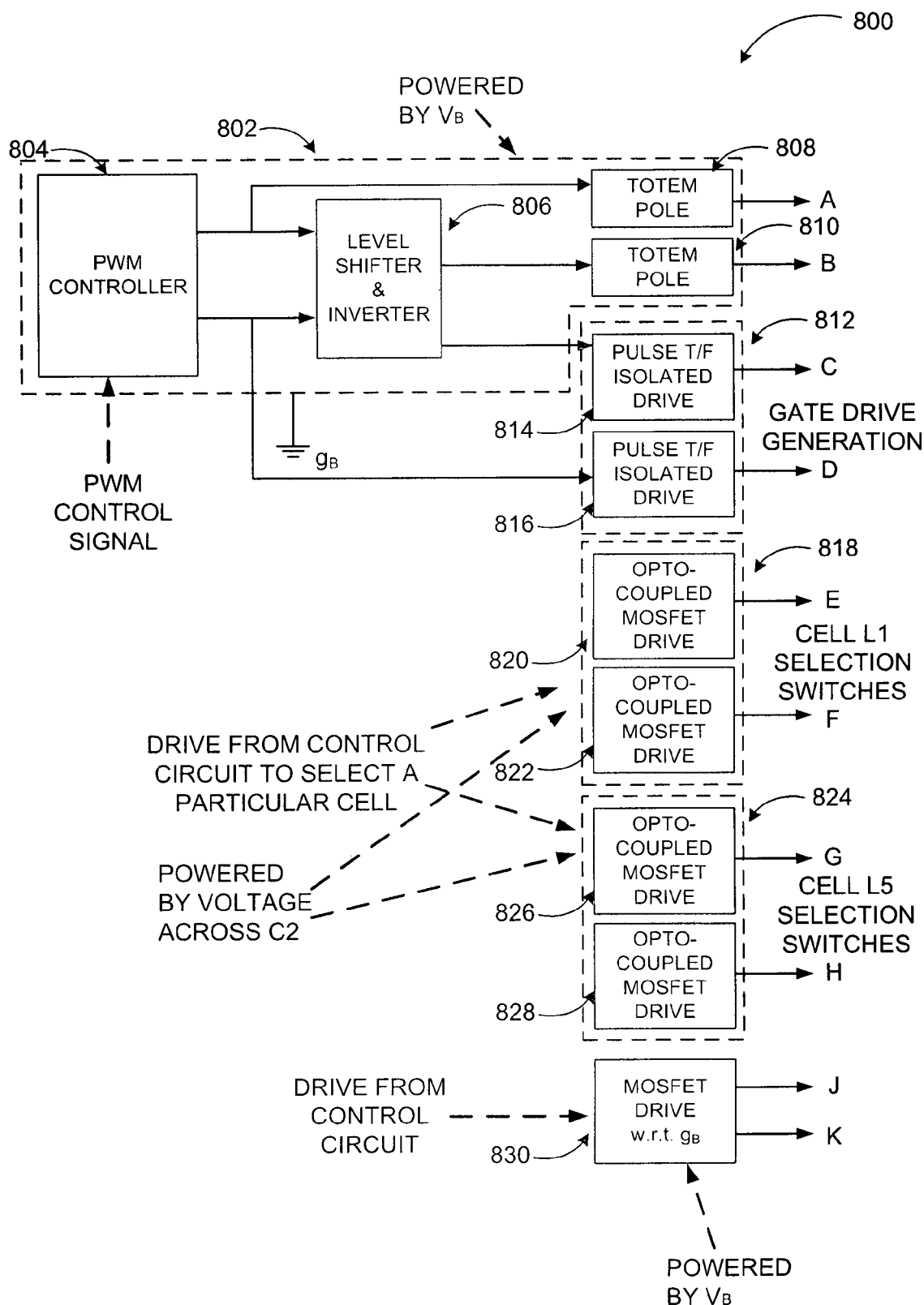
FIG. 8 illustrates a block diagram of an example photo-voltaic array fed ground isolated switched capacitor converter based cell balancing and battery charging mechanism.

FIG. 8 illustrates a block diagram of an example photovoltaic array fed ground isolated switched capacitor converter based cell balancing and battery charging mechanism, arranged according to at least some embodiments described herein.

As shown in diagram 800, the drive from the PWM controller 804 to the p-channel MOSFETs Q1 and Q3 may be level shifted (i.e., offset relative to the battery ground) and inverted in logic level (to adjust for different power supplies) at level shifter and inverter 806, and buffered with a complementary emitter follower 808, 810 (totem pole) before being applied to the respective gates. The PWM controller, inverters, level shifters and totem pole drives collectively shown in dashed lines 802 may be powered from battery voltage $V_B$. To ensure ground isolation of the SC converter output $V_o$ with respect to $g_B$, MOSFETs Q3 and Q4 of FIG. 7 may be driven by miniature pulse transformers 814 and 816 in some examples. To select a particular cell, for example cell L1, the control circuit may configured to selectively activate MOSFETs $Q_{1L1}$ (p-channel) and $Q_{2L1}$ (n-channel) through opto-coupled totem pole MOSFET drivers 820/822, 826/828, etc. These MOSFETs, along with other similar MOSFETs may constitute an example of switch SW2 in the circuit of FIG. 7. The drive signal from the control circuit may be provided to MOSFET drive 830. Circuits within dashed lines 818 and 824 may be powered by the voltage across capacitor C2 of diagram 700 as described in FIG. 7.

A voltage buck type SC DC-DC converter for battery charging and cell balancing according to some embodiments may provide a current boost enhancing the battery charge efficiency. Moreover, since cell balancing can be achieved along with cell charging by the same circuit as long as the PV array is illuminated, operating losses due to powering individual circuits may be reduced by not using separate charging and balancing circuits.

A cell balancing scheme according to some embodiments may be adapted to cell balance a serially coupled pack of ultra-capacitors. Ultra-capacitors may charge and discharge at a rate that is significantly higher than conventional batteries (e.g., about 30 s compared to an hour in the case of conventional batteries). Hence, the MOSFET switches may have to be selected to handle larger current surges that may be encountered with ultra-capacitors. Also, the charging time and the maximum cell voltage may be altered depending on the cell pack. Ultra-capacitors can be coupled together in series/parallel combinations for enhancing the voltage and current capabilities. To ensure long life and prevent premature aging, the voltage across all capacitors may need to be equalized. Unequal voltage distribution among the cells of a capacitor pack may result in more charge being stored in cells charged to a higher voltage and vice versa.

Figure 9:
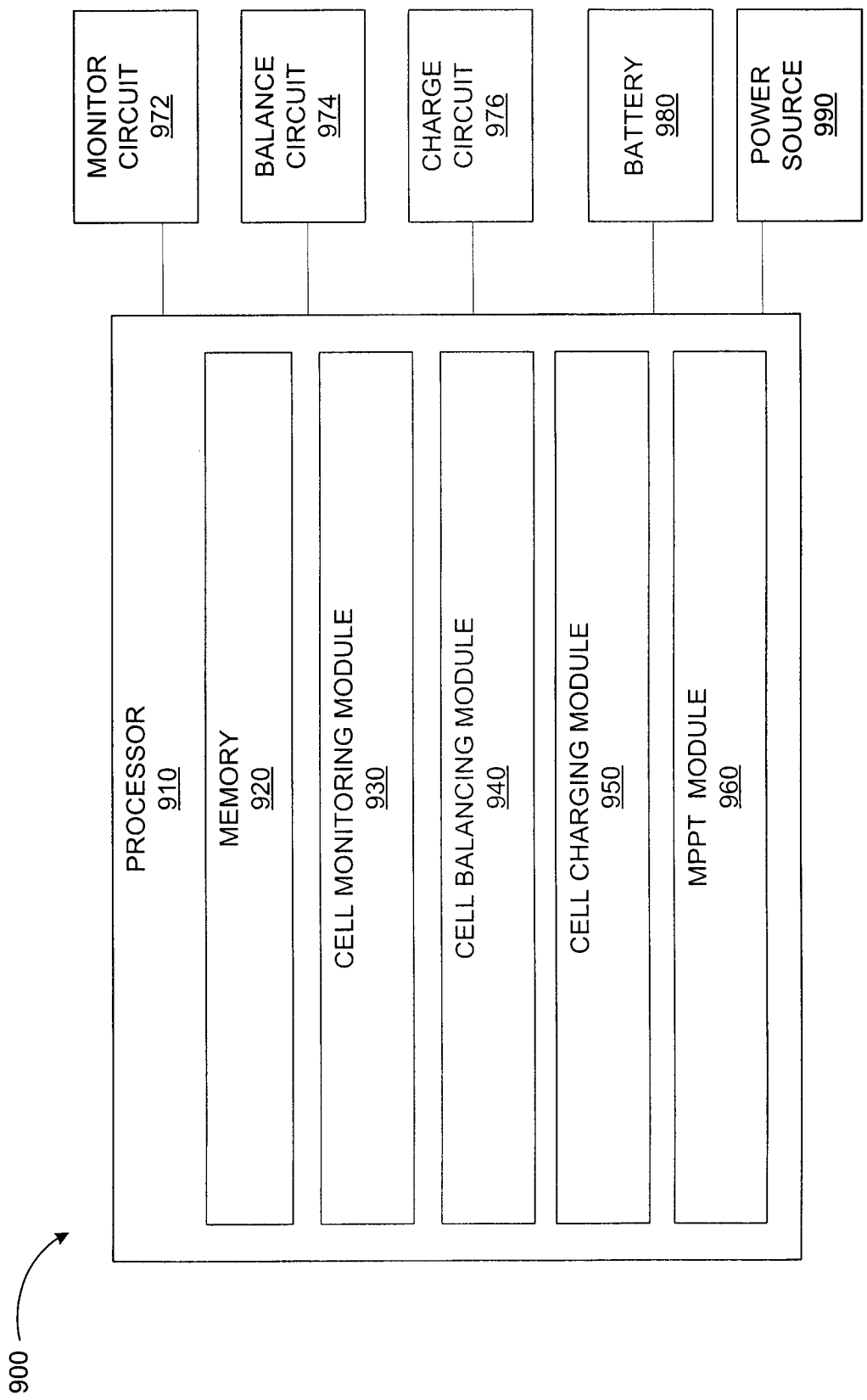
FIG. 9 illustrates an example special purpose processor, which may be used to control a battery charging according to at least some embodiments.

FIG. 9 illustrates an example special purpose processor, which may be configured to control a battery charging according to at least some embodiments described herein. Processor 910 of diagram 900 may be part of a charge module such as charge module 114 of FIG. 1 and manage different circuits associated with charging/balancing of a Li-Ion battery pack employing a cell balancing scheme.

Processor 910 may include a number of modules configured to control different aspects of charging the Li-Ion battery pack according to some embodiments. For example, cell monitoring module 930 may be configured to scan cell voltages of the battery pack through the monitor circuit 972 and activate balancing and/or charging when a cell voltage is determined to drop below a predefined voltage. Cell balancing module 940 may be configured to coordinate performance of a cell balancing scheme during the charging and/or discharging cycles through balance circuit 974. During the charging cycle, the cells reaching the EoC voltage earlier than the other cells may be deprived of any further charge current preventing their overcharge. Similarly, during the discharge phase, the cells reaching the EoD voltage earlier than the remaining cells of the pack may be charged so that their voltage falls more slowly than it would have without the cell balancing scheme.

Cell charging module 950 may be configured to manage charging of the battery 980 through charge circuit 976 receiving power from power source 990, which may be a PV array according to some embodiments. MPPT module 960 may be configured to execute an MPPT algorithm while the battery 980 is being charged or discharged adjusting duty cycles to ensure no cell of the battery is overcharged or over excessively discharged relative to optimum full charge and low charge levels, respectively, of the battery's specification.

Memory 920 may be configured to store instructions for the modules of processor 910, which may be implemented as hardware, software, or combination of hardware and software. Processor 910 may be configured to communicate through electrical couplings or through networked communications with other computing devices and/or data stores.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

FIG. 10 is a flow diagram illustrating an example method that may be performed by a processor controlling a battery charging device, such as processor 910 in FIG. 9. The operations described in blocks 1002 through 1022 may be stored as computer-executable instructions in a computer-readable medium such as memory 920 of processor 910 and executed by one or more modules of the processor.

A process of cell balancing based charging of a battery may begin with operation 1002, "SCAN CELL VOLTAGES." At operation 1002, the voltages of the individual cells of a battery such as cells L1 through L5 in FIG. 3 may be monitored by a control circuit (e.g., control circuit 312). Operation 1002 may be followed by decision operation 1004 "ALL CELLS>=$V_1$." At decision operation 1004, a determination may be made by control circuit 312 whether the voltage of any cell in the battery is below a predefined voltage. If all cell voltages are determined to be equal or above the predefined voltage at decision operation 1004, the control circuit may continue monitoring the cell voltages at operation 1002. If any cell has been determined to drop below the predefined voltage value, the process may continue from decision operation 1004 to operation 1006 "SELECT CELL WITH LOWEST VOLTAGE." At operation 1006, one of the cells (e.g., L1 through L5) with lowest detected battery voltage may be selected. Operation 1006 may be followed by decision operation 1008.

At decision operation 1008 "POWER SOURCE ACTIVE?", a determination may be made by a control circuit 312 whether power is still being received from the power source 112. For example, a PV array may continue providing power as long as it is illuminated. Operation 1012 may follow decision operation 1008 when the power source is determined to be active at decision operation 1008. Otherwise, operation 1018 may follow decision operation 1008 when the power source is determined to be inactive at decision operation 1008.

At operation 1012 "SET CHARGING TIME FOR CELL TO $T_1$," a charging time may be set for the selected cell by control circuit 312. Upon setting of the charge time $T_1$ at operation 1012, a charge circuit such as charge circuit 976 of FIG. 9 may charge the cells and monitor the cell voltage employing an MPPT algorithm at operation 1014 "CHARGE CELL & MONITOR (MPPT ALGORITHM)." As discussed in more detail below in conjunction with FIG. 11, the MPPT algorithm may adjust and lock duty cycles based on measured battery voltages. Decision operation 1016 may follow operation 1014. At decision operation 1016, "$V_{CELL}>=V_1$ OR t=$T_1$,", a determination may be made by the control circuit 312 whether the cell being charged has reached the predefined voltage level or the set time $T_1$ has expired. If either one of these conditions is met, the process may return from decision operation 1016 to operation 1002. Otherwise, the charging and monitoring may continue from decision operation 1016 to operation 1014.

At operation 1018, "SET BALANCING TIME FOR CELL TO $T_1$," a balancing time may be set for the selected cell by the control circuit 312. Operation 1018 may be followed by operation 1020, "PERFORM CELL BALANCING WITH FLYING CAPACITOR & MONITOR CELL," where cell balancing is performed by flying capacitor to ensure cells are not overcharged and not excessively discharged. Operation 1020 may be followed by decision operation 1022, "$V_{CELL}>=V_1$ OR t=$T_1$?", where a determination may be made by the control circuit 312 whether the cell being balanced has exceeded or equaled the predefined voltage level or the set time $T_1$ has expired. If either one of these conditions is met, the process may return from decision operation 1022 to operation 1002. Otherwise, the balancing and monitoring may continue from decision operation 1022 to operation 1020.

FIG. 11 illustrates a flow diagram illustrating an example maximum power point tracking method as part of the process of FIG. 10 that may be performed by a processor controlling a battery charging device, such as processor 910 in FIG. 9.

A process of employing MPPT in charging a Li-Ion battery may begin with operation 1102, "DETERMINE $V_{oc}$ OF PV SOURCE", where $V_{oc}$ indicates the open circuit voltage. At operation 1102, control circuit 312 of FIG. 3 may be adapted to measure an open circuit voltage of the power source 112 with the help of analog multiplexers 308 and 310, and by decoupling capacitor C1 from the power source as shown in FIG. 3. Operation 1102 may be followed by operation 1104 "SET MAX. POWER POINT (MPP) VOLTAGE ($V_{mp}$)= $k*V_{oc}$." At operation 1104, the MPP voltage may be set to a fraction of cell voltage $V_{oc}$ (for example, k=0.77). The multiplication factor may be chosen differently depending on a type of power source (e.g., different types of solar cells).

Operation 1104 may be followed by operation 1106, "RESET DUTY RATIO AND CHARGING VOLTAGE ($V_{sa}$)." At operation 1106, the duty ratio (cycle) of the switched capacitor DC-DC converter type power supply may be reset along with the charging voltage $V_{sa}$ for the battery by control circuit 312. Operation 1106 may be followed by operation 1108. At operation 1108 "INCREASE DUTY RATIO BY m %", the duty ratio may be increased by a predetermined amount by the controller circuit 312. Subsequent to operation 1108, the current charging voltage may be measured after an appropriate settling time at operation 1110 "MEASURE $V_{sapresent}$ AFTER n SEC DELAY (SETTLING TIME)."

Operation 1110 may be followed by decision operation 1112 "IS $V_{mp}=V_{sapresent}$?", where a determination may be made by control circuit 312 whether the current charging voltage is about the same as the maximum power point voltage. If the voltages are determined to be the same at decision operation 1112, then the duty ratio may be locked at its current value by the control circuit 312 at operation 1122 "LOCK DUTY RATIO AT PRESENT VALUE." If the voltages are determined to be not approximately equal at decision operation 1112, then another determination may be made at decision operation 1114 "IS $V_{mp}<V_{sapresent}$?" Decision operation 1116 may follow decision operation 1114 when the charging voltage is not determined to be greater than the maximum power point voltage at decision operation 1114. Otherwise, decision operation 1114 may be followed by operation 1118 when the charging voltage is determined to be greater than the maximum power point voltage at decision operation 1114.

At decision operation 1116 "HAS DUTY RATIO REACHED MAX," the controller circuit 312 can determine if the duty cycle ratio has reached a maximum limit. If the controller circuit 312 determines that the duty ratio has not yet reached its maximum limit, then decision operation 1116 may be followed by operation 1108 and controller circuit 312 may continue increasing the duty ratio by m % and measuring the charging voltage. If the controller circuit 312 determines that the maximum limit for the duty cycle ratio has been reached, then processing may continue from operation 1116 to operation 1122, "LOCK DUTY RATIO AT PRESENT VALUE", where the duty ratio may be locked at its current value by the control circuit 312.

At operation 1118 "IS $(V_{sapresent}-V_{mp})<(V_{mp}-V_{saprevious})$?", the controller circuit 312 can determine if the difference of maximum power point voltage and previous charging voltage is found to be greater than the difference between the maximum power point voltage and the current charging voltage. Processing at operation 1118 may continue to operation 1122 when $(V_{sapresent}-V_{mp})<(V_{mp}-V_{saprevious})$, where the duty ratio may be locked at its current value by the control circuit 312. Processing at operation 1118 may continue to operation 1120 when $(V_{sapresent}-V_{mp}) \geq (V_{mp}-V_{saprevious})$. At operation 1120, "DECREASE DUTY RATIO BY m %", the controller circuit 312 may decrease the duty cycle ratio of the charging circuit by m %. Operation 1120 may be followed by operation 1122, where the duty ratio may be locked at its current value.

The operations included in the above described process are for illustration purposes. Battery charging for li-ion batteries employing a photo-voltaic array fed switched capacitor dc-dc converter may be implemented by similar processes with fewer or additional operations. In some examples, the operations may be performed in a different order. In some other examples, various operations may be eliminated. In still other examples, various operations may be divided into additional operations, or combined together into fewer operations.

Figure 12:
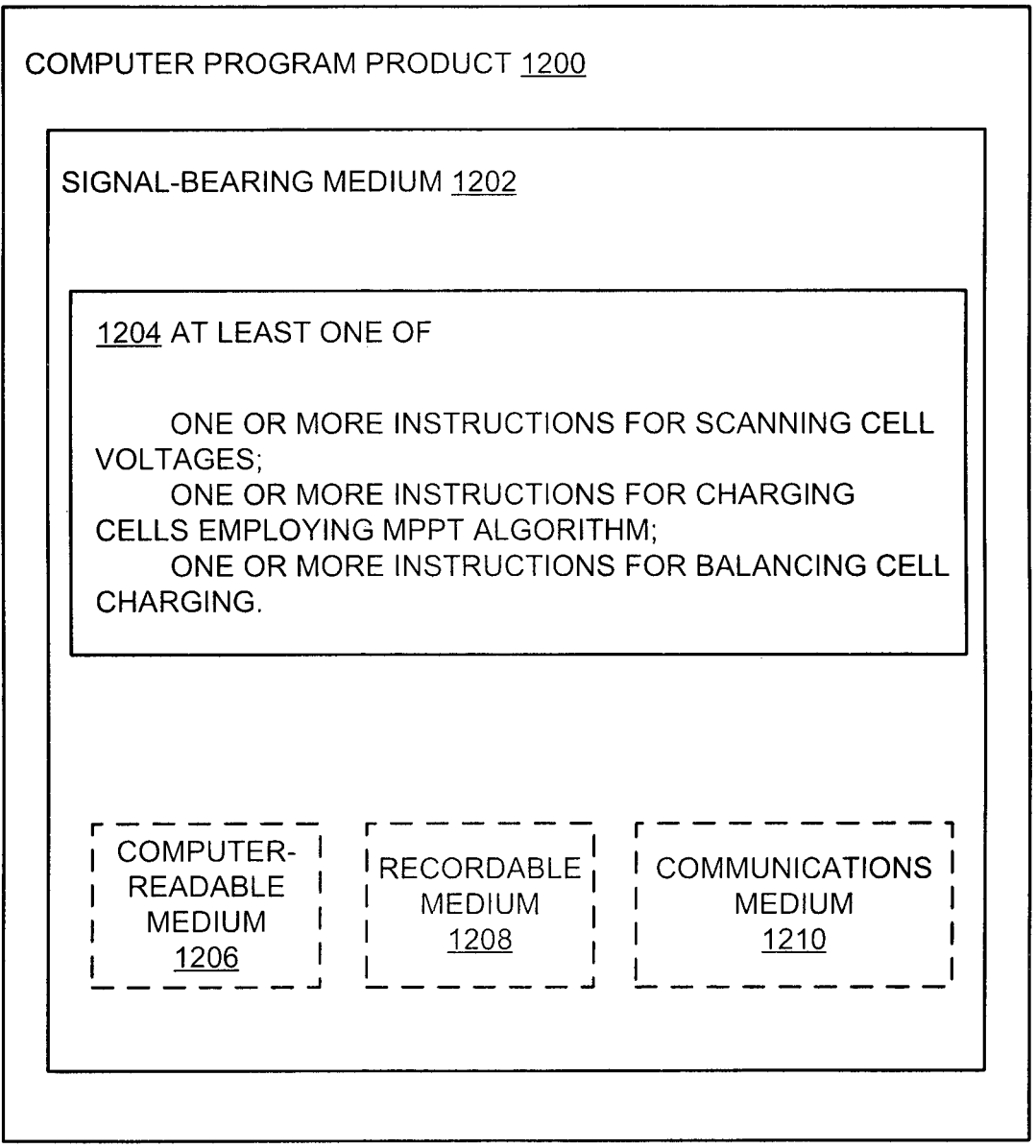
FIG. 12 illustrates a block diagram of an example computer program product, all arranged in accordance with at least some embodiments described herein.

FIG. 12 illustrates a block diagram of an example computer program product in accordance with at least some embodiments described herein. In some examples, as shown in FIG. 12, computer program product 1200 may include a signal bearing medium 1202 that may also include machine readable instructions 1204 that, when executed by, for example, a processor, may provide the functionality described above with respect to FIG. 9. Thus, for example, referring to processor 910, the modules 930 through 960 may undertake one or more of the tasks shown in FIG. 12 in response to instructions 1204 conveyed to processor 910 by medium 1202 to perform actions associated with scanning cell voltages, charging cells employing MPPT algorithm, and balancing cell charging.

In some implementations, signal bearing medium 1202 depicted in FIG. 12 may encompass a computer-readable medium 1206, such as, but not limited to, a hard disk drive, a Compact Disc (CD), a Digital Versatile Disk (DVD), a digital tape, memory, etc. In some implementations, signal bearing medium 1202 may encompass a recordable medium 1208, such as, but not limited to, memory, read/write (R/W) CDs, R/W DVDs, etc. In some implementations, signal bearing medium 1202 may encompass a communications medium 1210, such as, but not limited to, a digital and/or an analog communication medium (e.g., a fiber optic cable, a waveguide, a wired communications link, a wireless communication link, etc.). Thus, for example, computer program product 1200 may be conveyed to one or more modules of the processor 910 by an RF signal bearing medium 1202, where the signal bearing medium 1202 is conveyed by a wireless communications medium 1210 (e.g., a wireless communications medium conforming with the IEEE 802.11 standard).

In some examples, a method for balancing and charging a plurality of cells of a battery is described. An example method may include monitoring a cell voltage associated with each of the plurality of cells; selecting one of the plurality of cells for charging, where the cell voltage of the selected one of the plurality of cells corresponds to a lowest cell voltage; and determining if a power source is active 1008 or inactive. If the power source is determined to be active, the method may also include charging the selected one of the plurality of cells for a predefined period employing a maximum power point tracking (MPPT) scheme 1014; and upon one of: the cell voltage of the selected one of the plurality of cells reaching a predefined value and/or the predefined period expiring 1016, selecting another one of the plurality of cells for charging.

An example method may further include setting a balancing period for the selected cell 1018 if the power source is determined to be inactive; performing cell balancing 1020 of the selected one of the plurality of cells during the balancing period; and upon one of: the cell voltage of the selected one of the plurality of cells reaching the predefined value and/or the balancing period expiring 1022, selecting another one of the plurality of cells for charging.

According to other examples, the MPPT scheme may include determining an open circuit voltage ($V_{oc}$) 1102; and setting a maximum power point voltage ($V_{mp}$) such that $V_{mp}=k*V_{oc}$, where k is a predefined multiplication factor with a value of less than one 1104. The MPPT scheme may further include resetting a duty cycle ratio and a charging voltage ($V_{sa}$) of a charging circuit 1106; and increasing the duty cycle ratio by a predefined percentage 1108. The MPPT scheme may also include measuring a current value of a charging voltage ($V_{sa}$) after expiration of a predefined settling period 1110; and if the maximum power point voltage ($V_{mp}$) is determined to be about equal to the current value of the charging voltage ($V_{sa}$), locking the duty cycle ratio 1122.

According to further examples, the MPPT scheme may include continuing to increase the duty cycle ratio by the predefined percentage 1108 and continuing to measure the value of the current value of the charging voltage ($V_{sa}$) if the current value of the charging voltage ($V_{sa}$) is less than the maximum power point voltage ($V_{mp}$), and if the duty cycle ratio has not exceeded a predefined limit 1114, 1116. If the duty cycle ratio has reached the predefined limit 1116, the duty cycle ratio 1122 may be locked. The MPPT scheme may also include locking the duty cycle ratio 1122 if the current value of the charging voltage ($V_{sa}$) is greater than power point voltage ($V_{mp}$), and if a difference between the value of the current charging voltage ($V_{sa}$) value and the power point voltage ($V_{mp}$) is less than a difference between the power point voltage ($V_{mp}$) and a previous value of the charging voltage ($V_{sa}$) 1118. If the current value of the charging voltage ($V_{sa}$) is greater than power point voltage ($V_{mp}$), and if a difference between the value of the current charging voltage ($V_{sa}$) value and the power point voltage ($V_{mp}$) is equal to or greater than a difference between the power point voltage ($V_{mp}$) and a previous value of the charging voltage ($V_{sa}$) 1118, the duty cycle ratio may be decreased by the predefined percentage 1120 and locked. The power source 112 may be a photo voltaic array and the power source may be active when the photo voltaic array is illuminated. The battery 116 may be one of a Lithium-Ion (Li-Ion), a Nickel-Cadmium (Ni—Cd), or a Nickel-metal-hydride (NiMH) battery.

In other examples, a charging device 114 adapted to balance and charge a battery 116 comprising a plurality of battery cells is described. An example charging device may include a charging circuit and a control circuit. The charging circuit 304 may be adapted to select one of the plurality of battery cells for charging in response to a control signal and charge the selected one of the plurality of battery cells for the predefined period employing a maximum power point tracking (MPPT) scheme 1014. The control circuit 312 may be adapted to monitor a cell voltage associated with each of the plurality of battery cells; identify one of the plurality of battery cells for charging, wherein the identified battery cell has a lowest cell voltage among the battery cells; adapt the control signal to select the identified one of the plurality of battery cells; determine if a power source is active 1008; if the power source is determined to be active, adapting a charging circuit 304 to charge the selected battery cell (L1-L5); and upon one of: the cell voltage of the selected battery cell reaching a predefined value and/or a predefined period expiring 1016, select another battery cell to be charged.

According to further examples, the control circuit 312 may further be adapted to set a balancing period for the selected battery cell 1018 if the power source is inactive; cause the charging circuit 304 switch to a cell balancing mode 1020; monitor cell voltages of the plurality of battery cells 1020; and upon one of: the cell voltage of the selected battery cell reaching the predefined value and/or the balancing period expiring 1022, select another battery cell for charging. The control circuit 312 may further be adapted to monitor the plurality of battery cells until the cell voltage of at least one battery cell is detected below the predefined value 1002, 1004; and monitor the cell voltage of the selected battery cell while the selected battery cell is being charged 1014. The control circuit 312 may monitor the cell voltage of the selected battery cell employing a pair of analog multiplexers 308, 310 and a differential amplifier 311 coupled to outputs of the analog multiplexers.

According to yet other examples, the control circuit 312 may further be adapted to determine an open circuit voltage ($V_{oc}$) 1102; set a maximum power point voltage ($V_{mp}$) such that $V_{mp}=k*V_{oc}$, where k is a predefined multiplication factor with a value of less than one 1104; and increase the duty cycle ratio of the charging circuit by a predefined percentage 1108. The control circuit 312 may also measure a current charging voltage ($V_{sa}$) value after a predefined settling period 1110; and lock the duty cycle ratio 1122 if the maximum power point voltage ($V_{mp}$) is about equal to the current charging voltage ($V_{sa}$) value 1112.

If the current charging voltage ($V_{sa}$) is less than the maximum power point voltage ($V_{mp}$) and the duty cycle ratio has not yet reached a predefined limit 1114, 1116, the control circuit may continue to increase the duty cycle ratio by the predefined percentage 1108 and measure the current charging voltage ($V_{sa}$) value 1110; and lock the duty cycle ratio 1122 if the duty cycle ratio has reached the predefined limit 1116. If the current charging voltage ($V_{sa}$) is greater than the maximum power point voltage ($V_{mp}$) and a difference between the current charging voltage ($V_{sa}$) value and the maximum power point voltage ($V_{mp}$) is less than a difference between the maximum power point voltage ($V_{mp}$) and a previous charging voltage ($V_{sa}$) value 1118, the control circuit may lock the duty cycle ratio 1122. Alternatively, if the current charging voltage ($V_{sa}$) is greater than the maximum power point voltage ($V_{mp}$) and a difference between the current charging voltage ($V_{sa}$) value and the maximum power point voltage ($V_{mp}$) is equal to or greater than a difference between the maximum power point voltage ($V_{mp}$) and a previous charging voltage ($V_{sa}$) value 1118, the control circuit may decrease the duty cycle ratio by the predefined percentage 1120 and lock the duty cycle ratio 1122.

According to some examples, the charging circuit 304 may be a switched capacitor DC-DC converter, and include an input capacitor Cin, a first capacitor C1, a second capacitor C2, an output capacitor CF, and a first switch SW1 adapted to couple the first capacitor to the input capacitor and the second capacitor alternatively, and where a delay period is introduced between a phase of the charging circuit where the first capacitor is coupled to the input capacitor and a second phase of the charging circuit where the first capacitor is coupled to the second capacitor such that a charging circuit ground $g_{sc}$ is isolated from a power source ground $g_B$ and a battery ground $g_B$.

The charging circuit may further include a second switch SW2 adapted to couple the output capacitor CF to the selected battery cell L1-L5. The input capacitor Cin, the first capacitor C1, the second capacitor C2, the output capacitor CF may be low ESR ceramic capacitors. The first switch SW1, and the second switch SW2 may be implemented employing Metal Oxide Semiconductor Field Effect Transistors (MOSFETs). At least one of the charging circuit 304 and the control circuit 312 may be integrated with the battery 116. And, the power source 112 may be a photo voltaic array.

In further examples, a computer-readable storage medium 1202 having instructions stored thereon for controlling a charging device 114 adapted to balance and charge a battery 116 comprising a plurality of battery cells is described. Example instructions may include monitoring a cell voltage associated with each of the plurality of cells; selecting one of the plurality of cells for charging, where the cell voltage of the selected one of the plurality of cells corresponds to a lowest cell voltage; and determining if a power source is active 1008 or inactive. If the power source is determined to be active, the instructions may also include charging the selected one of the plurality of cells for a predefined period employing a maximum power point tracking (MPPT) scheme 1014; and upon one of: the cell voltage of the selected one of the plurality of cells reaching a predefined value and/or the predefined period expiring 1016, selecting another one of the plurality of cells for charging.

Example instructions may further include setting a balancing period for the selected cell 1018 if the power source is determined to be inactive; performing cell balancing 1020 of the selected one of the plurality of cells during the balancing period; and upon one of: the cell voltage of the selected one of the plurality of cells reaching the predefined value and/or the balancing period expiring 1022, selecting another one of the plurality of cells for charging.

According to other examples, the MPPT scheme may include determining an open circuit voltage ($V_{oc}$) 1102; and setting a maximum power point voltage ($V_{mp}$) such that $V_{mp}=k*V_{oc}$, where k is a predefined multiplication factor with a value of less than one 1104. The MPPT scheme may further include resetting a duty cycle ratio and a charging voltage ($V_{sa}$) of a charging circuit 1106; and increasing the duty cycle ratio by a predefined percentage 1108. The MPPT scheme may also include measuring a current value of a charging voltage ($V_{sa}$) after expiration of a predefined settling period 1110; and if the maximum power point voltage ($V_{mp}$) is determined to be about equal to the current value of the charging voltage ($V_{sa}$), locking the duty cycle ratio 1122.

According to further examples, the MPPT scheme may include continuing to increase the duty cycle ratio by the predefined percentage 1108 and continuing to measure the value of the current value of the charging voltage ($V_{sa}$) if the current value of the charging voltage ($V_{sa}$) is less than the maximum power point voltage ($V_{mp}$), and if the duty cycle ratio has not exceeded a predefined limit 1114, 1116. If the duty cycle ratio has reached the predefined limit 1116, the duty cycle ratio 1122 may be locked. The MPPT scheme may also include locking the duty cycle ratio 1122 if the current value of the charging voltage ($V_{sa}$) is greater than power point voltage ($V_{mp}$), and if a difference between the value of the current charging voltage ($V_{sa}$) value and the power point voltage ($V_{mp}$) is less than a difference between the power point voltage ($V_{mp}$) and a previous value of the charging voltage ($V_{sa}$) 1118. If the current value of the charging voltage ($V_{sa}$) is greater than power point voltage ($V_{mp}$), and if a difference between the value of the current charging voltage ($V_{sa}$) value and the power point voltage ($V_{mp}$) is equal to or greater than a difference between the power point voltage ($V_{mp}$) and a previous value of the charging voltage ($V_{sa}$) 1118, the duty cycle ratio may be decreased by the predefined percentage 1120 and locked. The power source 112 may be a photo voltaic array and the power source may be active when the photo voltaic array is illuminated. The battery 116 may be a Lithium-Ion (Li-Ion) battery, a Nickel-Cadmium (Ni—Cd), or a Nickel-metal-hydride (NiMH) battery.

According to other examples, the instructions may be executed by a processor 910 of a portable computing device 128 powered by a Lithium-Ion (Li-Ion) battery 116 that is balanced and charged by the charging device 114. The power source 112 may be a photo-voltaic array integrated into the portable computing device 138.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting setting charge times, setting balancing times, etc.).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method to balance and charge a plurality of cells of a battery, the method comprising:
    monitoring a cell voltage associated with each of the plurality of cells;
    selecting one of the plurality of cells to be charged, wherein the cell voltage of the selected one of the plurality of cells corresponds to a lowest cell voltage;
    determining whether a power source is active or inactive;
    in response to a determination that the power source is active, charging the selected one of the plurality of cells for a specific period by employing a maximum power point tracking (MPPT) scheme, the MPPT scheme including:
        determining an open circuit voltage ($V_{oc}$),
        setting a maximum power point voltage ($V_{mp}$) based on the $V_{oc}$,
        setting a charging duty cycle based on the $V_{mp}$ and a charging voltage ($V_{sa}$), and
        in response to a current $V_{sa}$ value being greater than the $V_{mp}$, one of:
            locking a duty cycle ratio if a difference between the current $V_{sa}$ value and the $V_{mp}$ is less than a difference between the $V_{mp}$ and a previous $V_{sa}$ value, or
            decreasing the duty cycle ratio by a specific percentage prior to locking the duty cycle ratio if the difference between the current $V_{sa}$ value and the $V_{mp}$ is equal to or greater than the difference between the $V_{mp}$ and the previous $V_{sa}$ value; and
    selecting another one of the plurality of cells to be charged in response to one or more of: the cell voltage of the selected one of the plurality of cells reaching a specific value and/or the specific period expiring.

2. The method according to claim 1, further comprising:
    in response to a determination that the power source is inactive, setting a balancing period for the selected one of the plurality of cells;
    performing cell balancing of the selected one of the plurality of cells during the balancing period; and
    selecting another one of the plurality of cells to be charged in response to one or more of: the cell voltage of the selected one of the plurality of cells reaching the specific value and/or the specific period expiring.

3. The method according to claim 1, wherein setting the $V_{mp}$ based on the $V_{oc}$ comprises:
    setting the $V_{mp}$ such that the $V_{mp}=k*V_{oc}$, wherein k is a multiplication factor with a value of less than one.

4. The method according to claim 3, wherein the MPPT scheme further comprises:
    resetting the duty cycle ratio and the $V_{sa}$ of a charger circuit; and
    increasing the duty cycle ratio by the specific percentage.

5. The method according to claim 3, wherein the MPPT scheme further comprises:
    measuring the current $V_{sa}$ value after expiration of a settling period; and
    in response to a determination that the $V_{mp}$ is equal to the current $V_{sa}$ value, locking the duty cycle ratio.

6. The method according to claim 5, wherein the MPPT scheme further comprises:
    if the current $V_{sa}$ value is less than the $V_{mp}$ and if the duty cycle ratio has not exceeded a particular limit, continuing to increase the duty cycle ratio by the specific percentage and continuing to measure the current $V_{sa}$ value of the.

7. The method according to claim 6, wherein the MPPT scheme further comprises:
    after the duty cycle ratio has reached the particular limit, locking the duty cycle ratio.

8. The method according to claim 1, wherein the power source includes a photo voltaic array and the power source is active while the photo voltaic array is illuminated.

9. The method according to claim 1, wherein the battery includes one of a lithium-ion (Li-ion), a nickel-cadmium (Ni—Cd), or a nickel-metal-hydride (NiMH) battery.

10. A charger device adapted to balance and charge a battery comprising a plurality of battery cells, the charger device comprising:
    a charger circuit adapted to:
        select one of the plurality of battery cells to be charged in response to a control signal;
        charge the selected one of the plurality of battery cells for a specific period by use of a maximum power point tracking (MPPT) scheme; and
    a control circuit coupled to the charger circuit and adapted to:
        monitor a cell voltage associated with each of the plurality of battery cells;
        identify one of the plurality of battery cells to be charged, wherein the identified battery cell has a lowest cell voltage among the battery cells;
        adapt the control signal to select, as the selected one of the plurality of battery cells, the identified one of the plurality of battery cells;
        determine whether a power source is active;
        in response to a determination that the power source is active, adapt the charger circuit to charge the selected one of the plurality of battery cells through the MPPT scheme, the MPPT scheme including:
            determine an open circuit voltage ($V_{oc}$),
            set a maximum power point voltage ($V_{mp}$) based on the $V_{oc}$
            set a charging duty cycle based on the $V_{mp}$ and a charging voltage ($V_{sa}$), and
            in response to a current $V_{sa}$ value being greater than the $V_{mp}$, one of:
                lock a duty cycle ratio if a difference between the current $V_{sa}$ value and the $V_{mp}$ is less than a difference between the $V_{mp}$ and a previous $V_{sa}$ value, or
                decrease the duty cycle ratio by a specific percentage prior to the duty cycle ratio being locked if the difference between the current $V_{sa}$ value and the $V_{mp}$ is equal to or greater than the difference between the $V_{mp}$ and the previous $V_{sa}$ value; and
        select another one of the plurality of battery cells to be charged in response to one or more of: the cell voltage of the selected one of the plurality of battery cells having reached a specific value and/or expiration of the specific period.

11. The charger device according to claim 10, wherein the control circuit is further adapted to:
    in response to a determination that the power source is inactive, set a balancing period for the selected one of the plurality of battery cells;

cause the charger circuit to switch to a cell balancing mode;
monitor cell voltages of the plurality of battery cells; and
select another one of the plurality of battery cells to be charged in response to one or more of: the cell voltage of the selected one of the plurality of battery cells having reached the specific value and/or expiration of the balancing period.

12. The charger device according to claim 10, wherein the control circuit is further adapted to:
monitor the plurality of battery cells until the cell voltage of at least one battery cell is detected below the specific value; and
monitor the cell voltage of the selected one of the plurality of battery cells while the selected one of the plurality of battery cells is being charged.

13. The charger device according to claim 12, wherein the control circuit is adapted to monitor the cell voltage of the selected one of the plurality of battery cells by use of a pair of analog multiplexers and a differential amplifier coupled to output terminals of the analog multiplexers.

14. The charger device according to claim 10, wherein the control circuit is further adapted to:
set the $V_{mp}$ such that the $V_{mp}=k*V_{oc}$, wherein k is a multiplication factor with a value of less than one; and
increase the duty cycle ratio of the charger circuit by the specific percentage.

15. The charger device according to claim 14, wherein the control circuit is further adapted to:
measure the current $V_{sa}$ value after a settling period; and
in response to a determination that the $V_{mp}$ is equal to the current $V_{sa}$ value, lock the duty cycle ratio.

16. The charger device according to claim 15, wherein the control circuit is further adapted to:
if the current $V_{sa}$ value is less than the $V_{mp}$ and the duty cycle ratio has not yet reached a particular limit, continue to increase the duty cycle ratio by the specific percentage and measure the current $V_{sa}$ value; and
after the duty cycle ratio has reached the particular limit, lock the duty cycle ratio.

17. The charger device according to claim 10, wherein the charger circuit includes a switched capacitor DC-DC converter.

18. The charging charger device according to claim 10, wherein the charger circuit includes a switch adapted to couple an output capacitor to the selected one of the plurality of battery cells.

19. The charger device according to claim 18, wherein the charger circuit includes an input capacitor, a first capacitor, a second capacitor, the output capacitor, the switch, and another switch that are implemented with metal oxide semiconductor field effect transistors (MOSFETs).

20. The charger device according to claim 10, wherein at least one of the charger circuit and the control circuit are integrated with the battery.

21. The charger device according to claim 10, wherein the power source includes a photo voltaic array.

22. A non-transitory computer-readable storage medium that includes instructions stored thereon to control a charger device adapted to balance and charge a battery comprising a plurality of battery cells, the instructions comprising:
monitoring a cell voltage associated with each of the plurality of cells;
selecting one of the plurality of cells to be charged, wherein the cell voltage of the selected one of the plurality of cells corresponds to a lowest cell voltage;
determining whether a power source is active or inactive;
in response to a determination that the power source is active, charging the selected one of the plurality of cells, using a charger circuit, for a specific period by employing a maximum power point tracking (MPPT) scheme, the MPPT scheme including:
determining an open circuit voltage ($V_{oc}$),
setting a maximum power point voltage ($V_{mp}$) based on the $V_{oc}$,
setting a charging duty cycle based on the $V_{mp}$ and a charging voltage ($V_{sa}$), and
in response to a current $V_{sa}$ value being greater than the $V_{mp}$, one of:
locking a duty cycle ratio if a difference between the current $V_{sa}$ value and the $V_{mp}$ is less than a difference between the $V_{mp}$ and a previous $V_{sa}$ value, or
decreasing the duty cycle ratio by a specific percentage prior to locking the duty cycle ratio if the difference between the current $V_{sa}$ value and the $V_{mp}$ is equal to or greater than the difference between the $V_{mp}$ and the previous $V_{sa}$ value; and
selecting another one of the plurality of cells to be charged in response to one or more of: the cell voltage of the selected one of the plurality of cells reaching a specific value and/or the specific period expiring.

23. The non-transitory computer-readable storage medium according to claim 22, wherein the instructions further comprise:
in response to a determination that the power source is inactive, setting a balancing period for the selected one of the plurality of cells;
performing cell balancing of the selected one of the plurality of cells during the balancing period; and
selecting another one of the plurality of cells to be charged in response to one or more of: the cell voltage of the selected one of the plurality of cells reaching the specific value and/or the specific period expiring.

24. The non-transitory computer-readable storage medium according to claim 22, wherein the instructions further comprise:
setting the $V_{mp}$ such that the $V_{mp}=k*V_{oc}$, wherein k is a multiplication factor with a value of less than one.

25. The non-transitory computer-readable storage medium according to claim 24, wherein the instructions further comprise:
measuring the current $V_{sa}$ value after expiration of a settling period; and
in response to a determination that the $V_{mp}$ is equal to the current $V_{sa}$ value, locking the duty cycle ratio.

26. The non-transitory computer-readable storage medium according to claim 25, wherein the instructions further comprise:
if the current $V_{sa}$ value is less than the $V_{mp}$, and if the duty cycle ratio has not exceeded a particular limit, continuing to increase the duty cycle ratio by the specific percentage and continuing to measure the current $V_{sa}$ value.

27. The non-transitory computer-readable storage medium according to claim 22, wherein the instructions are executed by a processor of a portable computing device powered by a lithium-ion (Li-ion) battery that is balanced and charged by the charger device.

28. The non-transitory computer-readable storage medium according to claim 27, wherein the power source includes a photo-voltaic array integrated into the portable computing device.

* * * * *

UNITED STATES PATENT AND TRADEMARK OFFICE
CERTIFICATE OF CORRECTION

PATENT NO. : 9,018,892 B2  
APPLICATION NO. : 13/265619  
DATED : April 28, 2015  
INVENTOR(S) : Agarwal et al.

Page 1 of 1

It is certified that error appears in the above-identified patent and that said Letters Patent is hereby corrected as shown below:

ON THE TITLE PAGE

On Page 2, in Item (56), under "OTHER PUBLICATIONS", in Column 2, Lines 27-28, delete ""Analysis and design of a gound isolated buck switched capacitor dc-dc conveter,"" and insert -- "Analysis and design of a ground isolated buck switched capacitor dc-dc converter," --, therefor.

On Page 2, in Item (56), under "OTHER PUBLICATIONS", in Column 2, Line 31, delete "lithium ion artery," and insert -- lithium ion battery, --, therefor.

IN THE SPECIFICATION

In Column 3, Line 66, delete "during," and insert -- during --, therefor.

IN THE CLAIMS

In Column 22, Lines 6-7, in Claim 6, delete "$V_{sa}$value of the." and insert -- $V_{sa}$ value. --, therefor.

In Column 23, Line 44, in Claim 18, delete "The charging charger device" and insert -- The charger device --, therefor.

Signed and Sealed this  
Twentieth Day of October, 2015

Michelle K. Lee  
*Director of the United States Patent and Trademark Office*